United States Patent
Kompala et al.

(10) Patent No.: US 12,170,559 B2
(45) Date of Patent: Dec. 17, 2024

(54) TECHNIQUES FOR IMPLEMENTING A CODEBOOK SCALING FACTOR FOR VARIABLE FREQUENCY RESPONSE HANDLING

(71) Applicant: QUALCOMM Incorporated, San Diego, CA (US)

(72) Inventors: Surendra Kompala, Fremont, CA (US); Sachin Jain, Milpitas, CA (US); Mihir Vijay Laghate, San Diego, CA (US); Isan Doshi, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 18/150,556

(22) Filed: Jan. 5, 2023

(65) Prior Publication Data

US 2023/0291448 A1    Sep. 14, 2023

Related U.S. Application Data

(60) Provisional application No. 63/269,293, filed on Mar. 14, 2022.

(51) Int. Cl.
*H04B 7/06*    (2006.01)

(52) U.S. Cl.
CPC ......... *H04B 7/0617* (2013.01); *H04B 7/0682* (2013.01)

(58) Field of Classification Search
CPC .............................. H04B 7/0617; H04B 7/0682
USPC ......................................................... 375/267
See application file for complete search history.

(56) References Cited

U.S. PATENT DOCUMENTS

| | | | |
|---|---|---|---|
| 2008/0144751 A1* | 6/2008 | Xia | H04B 7/0691 375/347 |
| 2009/0270118 A1 | 10/2009 | Jin et al. | |
| 2012/0045003 A1* | 2/2012 | Li | H04B 7/0478 375/260 |

OTHER PUBLICATIONS

International Search Report and Written Opinion—PCT/US2023/063697—ISA/EPO—May 23, 2023.
Khaled N., et al., "Interpolation-Based Multi-Mode Precoding for MIMO-OFDM Systems with Limited Feedback", IEEE Transactions on Wireless Communications, IEEE Service Center, Piscataway, NJ, US, vol. 6, No. 3, Mar. 1, 2007, pp. 1003-1013, XP011184326, paragraph [0026] -paragraph [0082].

* cited by examiner

*Primary Examiner* — Fitwi Y Hailegiorgis
(74) *Attorney, Agent, or Firm* — Dalei Dong; Harrity & Harrity, LLP

(57) ABSTRACT

Various aspects of the present disclosure generally relate to wireless communication. In some aspects, a wireless communication device may identify, based at least in part on a scaling factor, one or more phase weights associated with a transmit beam of the wireless communication device. The scaling factor is associated with a frequency in a frequency band associated with the wireless communication device. The wireless communication device may generate, based at least in part on the one or more phase weights, the transmit beam. The wireless communication device may transmit a wireless communication using the transmit beam. Numerous other aspects are described.

30 Claims, 16 Drawing Sheets

TECHNIQUES FOR IMPLEMENTING A CODEBOOK SCALING FACTOR FOR VARIABLE FREQUENCY RESPONSE HANDLING

CROSS-REFERENCE TO RELATED APPLICATION

This Patent Application claims priority to U.S. Provisional Patent Application No. 63/269,293, filed on Mar. 14, 2022, entitled "TECHNIQUES FOR IMPLEMENTING A CODEBOOK SCALING FACTOR FOR VARIABLE FREQUENCY RESPONSE HANDLING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for implementing a codebook scaling factor for variable frequency response handling.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include identifying, based at least in part on a scaling factor, one or more phase weights associated with a transmit beam of the wireless communication device, where the scaling factor is associated with a frequency in a frequency band associated with the wireless communication device. The method may include generating, based at least in part on the one or more phase weights, the transmit beam. The method may include transmitting a wireless communication using the transmit beam.

Some aspects described herein relate to a method performed by a device. The method may include generating a plurality of electric field measurements for each frequency of a plurality of frequencies included in a frequency band associated with a wireless communication device, where each electric field measurement of the plurality of electric field measurements is associated with a respective frequency of the plurality of frequencies. The method may include generating a codebook for the frequency band based at least in part on a first electric field measurement, of the plurality of electric field measurements, associated with a first frequency of the plurality of frequencies. The method may include generating respective scaling factors for each of a plurality of second frequencies of the plurality of frequencies based at least in part on respective electric field measurements, of the plurality of electric field measurements, associated with each of the plurality of second frequencies.

Some aspects described herein relate to a method performed by a device. The method may include generating respective electric field measurements for each frequency of a plurality of frequencies included in a frequency band associated with a wireless communication device. The method may include generating a codebook for the frequency band based at least in part on the respective electric field measurements.

Some aspects described herein relate to a method performed by a device. The method may include generating respective electric field measurements for each frequency of a plurality of frequencies included in a frequency band associated with a wireless communication device. The method may include generating respective codebooks for each frequency of the plurality of frequencies included in the frequency band based at least in part on the respective electric field measurements.

Some aspects described herein relate to a method of wireless communication performed by a wireless communication device. The method may include identifying a codebook associated with a frequency in a frequency band associated with the wireless communication device, where the codebook is among a plurality of codebooks, stored by the wireless communication device, for the frequency band. The method may include generating a transmit beam based at least in part on the codebook. The method may include transmitting a wireless communication using the transmit beam.

Some aspects described herein relate to a wireless communication device for wireless communication. The wireless communication device may include a memory and one or more processors coupled to the memory. The one or more processors may be configured to identify, based at least in part on a scaling factor, one or more phase weights associated with a transmit beam of the wireless communication device. The one or more processors may be configured to generate, based at least in part on the one or more phase weights, the transmit beam. The one or more processors may be configured to transmit a wireless communication using the transmit beam.

Some aspects described herein relate to a device. The device may include a memory and one or more processors coupled to the memory. The one or more processors may be configured to generate a plurality of electric field measurements for each frequency of a plurality of frequencies included in a frequency band associated with a wireless communication device. The one or more processors may be configured to generate a codebook for the frequency band based at least in part on a first electric field measurement, of the plurality of electric field measurements, associated with a first frequency of the plurality of frequencies. The one or more processors may be configured to generate respective scaling factors for each of a plurality of second frequencies of the plurality of frequencies based at least in part on respective electric field measurements, of the plurality of electric field measurements, associated with each of the plurality of second frequencies.

Some aspects described herein relate to a device. The device may include a memory and one or more processors coupled to the memory. The one or more processors may be configured to generate respective electric field measurements for each frequency of a plurality of frequencies included in a frequency band associated with a wireless communication device. The one or more processors may be configured to generate a codebook for the frequency band based at least in part on the respective electric field measurements.

Some aspects described herein relate to a device. The device may include a memory and one or more processors coupled to the memory. The one or more processors may be configured to generate respective electric field measurements for each frequency of a plurality of frequencies included in a frequency band associated with a wireless communication device. The one or more processors may be configured to generate respective codebooks for each frequency of the plurality of frequencies included in the frequency band based at least in part on the respective electric field measurements.

Some aspects described herein relate to a wireless communication device for wireless communication. The wireless communication device may include a memory and one or more processors coupled to the memory. The one or more processors may be configured to identify a codebook associated with a frequency in a frequency band associated with the wireless communication device. The one or more processors may be configured to generate a transmit beam based at least in part on the codebook. The one or more processors may be configured to transmit a wireless communication using the transmit beam.

Some aspects described herein relate to a non-transitory computer-readable medium that stores a set of instructions for wireless communication by a wireless communication device. The set of instructions, when executed by one or more processors of the wireless communication device, may cause the wireless communication device to identify, based at least in part on a scaling factor, one or more phase weights associated with a transmit beam of the wireless communication device. The set of instructions, when executed by one or more processors of the wireless communication device, may cause the wireless communication device to generate, based at least in part on the one or more phase weights, the transmit beam. The set of instructions, when executed by one or more processors of the wireless communication device, may cause the wireless communication device to transmit a wireless communication using the transmit beam.

Some aspects described herein relate to a non-transitory computer-readable medium that stores a set of instructions by a device. The set of instructions, when executed by one or more processors of the device, may cause the device to generate a plurality of electric field measurements for each frequency of a plurality of frequencies included in a frequency band associated with a wireless communication device. The set of instructions, when executed by one or more processors of the device, may cause the device to generate a codebook for the frequency band based at least in part on a first electric field measurement, of the plurality of electric field measurements, associated with a first frequency of the plurality of frequencies. The set of instructions, when executed by one or more processors of the device, may cause the device to generate respective scaling factors for each of a plurality of second frequencies of the plurality of frequencies based at least in part on respective electric field measurements, of the plurality of electric field measurements, associated with each of the plurality of second frequencies.

Some aspects described herein relate to a non-transitory computer-readable medium that stores a set of instructions by a device. The set of instructions, when executed by one or more processors of the device, may cause the device to generate respective electric field measurements for each frequency of a plurality of frequencies included in a frequency band associated with a wireless communication device. The set of instructions, when executed by one or more processors of the device, may cause the device to generate a codebook for the frequency band based at least in part on the respective electric field measurements.

Some aspects described herein relate to a non-transitory computer-readable medium that stores a set of instructions by a device. The set of instructions, when executed by one or more processors of the device, may cause the device to generate respective electric field measurements for each frequency of a plurality of frequencies included in a frequency band associated with a wireless communication device. The set of instructions, when executed by one or more processors of the device, may cause the device to generate respective codebooks for each frequency of the plurality of frequencies included in the frequency band based at least in part on the respective electric field measurements.

Some aspects described herein relate to a non-transitory computer-readable medium that stores a set of instructions for wireless communication by a wireless communication device. The set of instructions, when executed by one or more processors of the wireless communication device, may cause the wireless communication device to identify a codebook associated with a frequency in a frequency band associated with the wireless communication device. The set of instructions, when executed by one or more processors of the wireless communication device, may cause the wireless communication device to generate a transmit beam based at least in part on the codebook. The set of instructions, when executed by one or more processors of the wireless communication device, may cause the wireless communication device to transmit a wireless communication using the transmit beam.

Some aspects described herein relate to an apparatus for wireless communication. The apparatus may include means for identifying, based at least in part on a scaling factor, one or more phase weights associated with a transmit beam of the apparatus, where the scaling factor is associated with a frequency in a frequency band associated with the apparatus. The apparatus may include means for generating, based at least in part on the one or more phase weights, the transmit beam. The apparatus may include means for transmitting a wireless communication using the transmit beam.

Some aspects described herein relate to an apparatus. The apparatus may include means for generating a plurality of electric field measurements for each frequency of a plurality of frequencies included in a frequency band associated with a wireless communication device, where each electric field measurement of the plurality of electric field measurements is associated with a respective frequency of the plurality of frequencies. The apparatus may include means for generating a codebook for the frequency band based at least in part on a first electric field measurement, of the plurality of electric field measurements, associated with a first frequency of the plurality of frequencies. The apparatus may include means for generating respective scaling factors for each of a plurality of second frequencies of the plurality of frequencies based at least in part on respective electric field measurements, of the plurality of electric field measurements, associated with each of the plurality of second frequencies.

Some aspects described herein relate to an apparatus. The apparatus may include means for generating respective electric field measurements for each frequency of a plurality of frequencies included in a frequency band associated with a wireless communication device. The apparatus may include means for generating a codebook for the frequency band based at least in part on the respective electric field measurements.

Some aspects described herein relate to an apparatus. The apparatus may include means for generating respective electric field measurements for each frequency of a plurality of frequencies included in a frequency band associated with a wireless communication device. The apparatus may include means for generating respective codebooks for each frequency of the plurality of frequencies included in the frequency band based at least in part on the respective electric field measurements.

Some aspects described herein relate to an apparatus for wireless communication. The apparatus may include means for identifying a codebook associated with a frequency in a frequency band associated with the apparatus, where the codebook is among a plurality of codebooks, stored by the apparatus, for the frequency band. The apparatus may include means for generating a transmit beam based at least in part on the codebook. The apparatus may include means for transmitting a wireless communication using the transmit beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
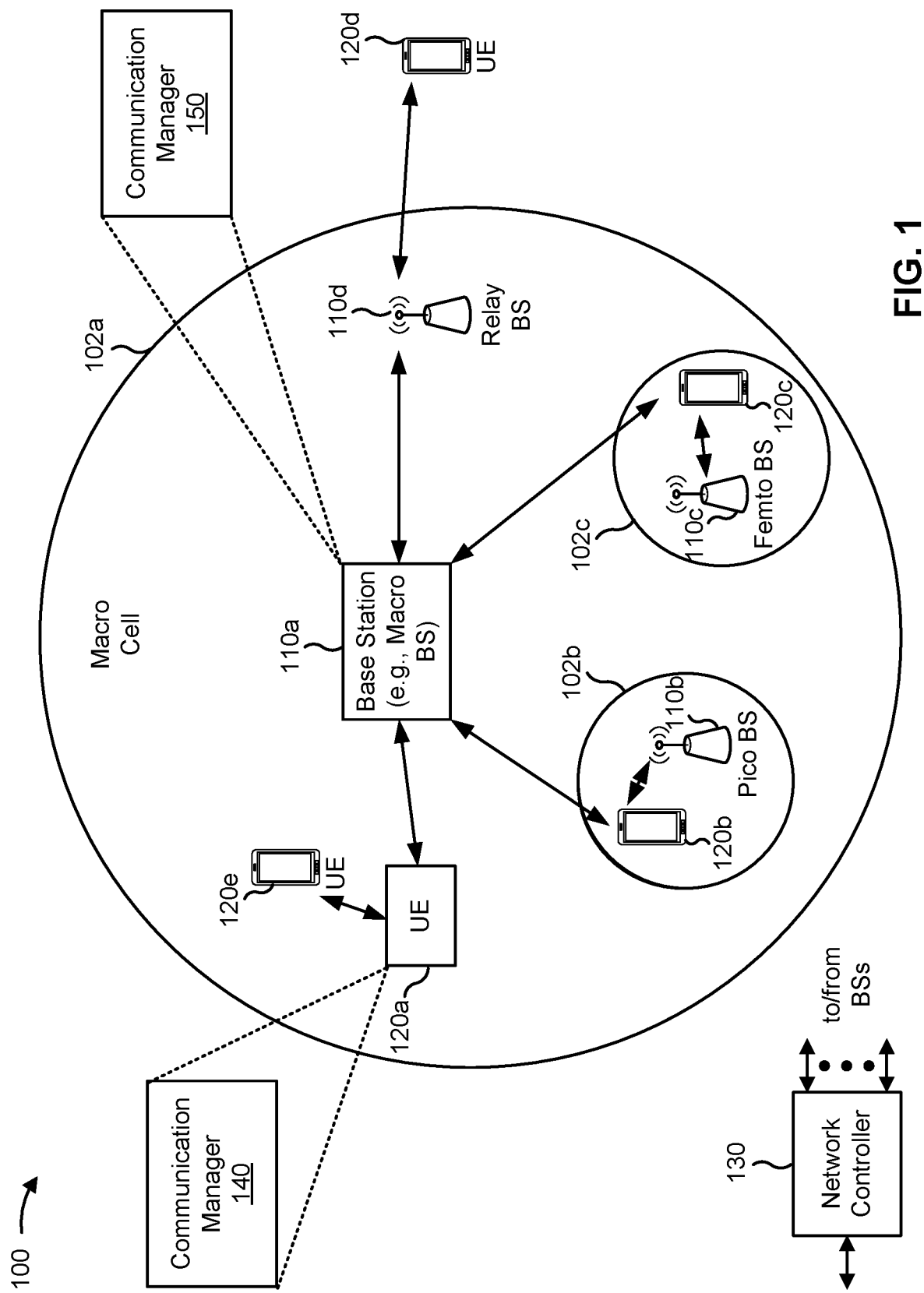
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the terms "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station," "network node," or "network entity" may refer to one device configured to perform one or more functions, such as those described herein in connection with the base station 110. In some aspects, the terms "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station," "network node," or "network entity" may refer to any one or more of those different devices. In some aspects, the terms "base station," "network node," or "network entity" may refer to one or more virtual base stations and/or one or more virtual base station functions. For example, in some aspects, two or more base station functions may be instantiated on a single device. In some aspects, the terms "base station," "network node," or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device may include a communication manager. For example, a UE 120 may include a communication manager 140. As another example, a base station 110 may include a communication manager 150. As described in more detail elsewhere herein, a communication manager (e.g., the communication manager 140, the communication manager 150) may identify, based at least in part on a scaling factor, one or more phase weights associated with a transmit beam of the wireless communication device, wherein the scaling factor is associated with a frequency in a frequency band associated with the wireless communication device; generate, based at least in part on the one or more phase weights, the transmit beam; and transmit a wireless communication using the transmit beam.

As described in more detail elsewhere herein, a communication manager (e.g., the communication manager 140, the communication manager 150) may identify a codebook associated with a frequency in a frequency band associated with the wireless communication device, wherein the codebook is among a plurality of codebooks, stored by the wireless communication device, for the frequency band; generate a transmit beam based at least in part on the codebook; and transmit a wireless communication using the transmit beam. Additionally, or alternatively, a communication manager (e.g., the communication manager 140, the communication manager 150) may perform one or more other operations described herein.

As indicated above, FIG. 1 is provided as an example. Other examples may differ from what is described with regard to FIG. 1.

Figure 2:
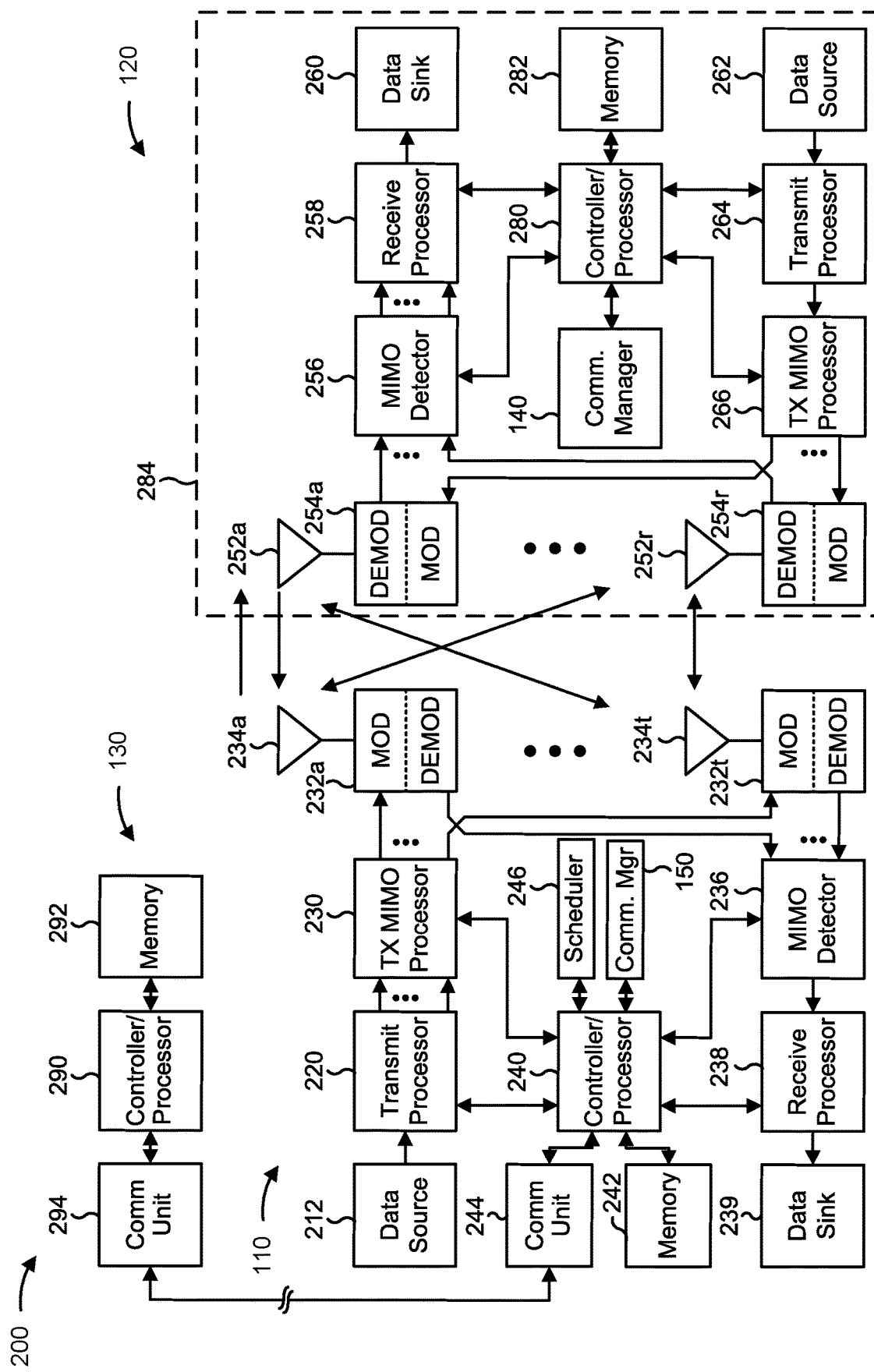
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-18).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-18).

The controller/processor 240 of the base station 110, the controller/processor 280 of the UE 120, and/or any other component(s) of FIG. 2 may perform one or more techniques associated with techniques for implementing a codebook scaling factor for variable frequency response handling, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the wireless communication device includes means for identifying, based at least in part on a scaling factor, one or more phase weights associated with a transmit beam of the wireless communication device, wherein the scaling factor is associated with a frequency in a frequency band associated with the wireless communication device; means for generating, based at least in part on the one or more phase weights, the transmit beam; and/or means for transmitting a wireless communication using the transmit beam. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246 of the base station 110. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282 of the UE 120.

In some aspects, the wireless communication device includes means for identifying a codebook associated with a frequency in a frequency band associated with the wireless communication device, wherein the codebook is among a plurality of codebooks, stored by the wireless communication device, for the frequency band; means for generating a transmit beam based at least in part on the codebook; and/or means for transmitting a wireless communication using the transmit beam. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246 of the base station 110. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282 of the UE 120.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
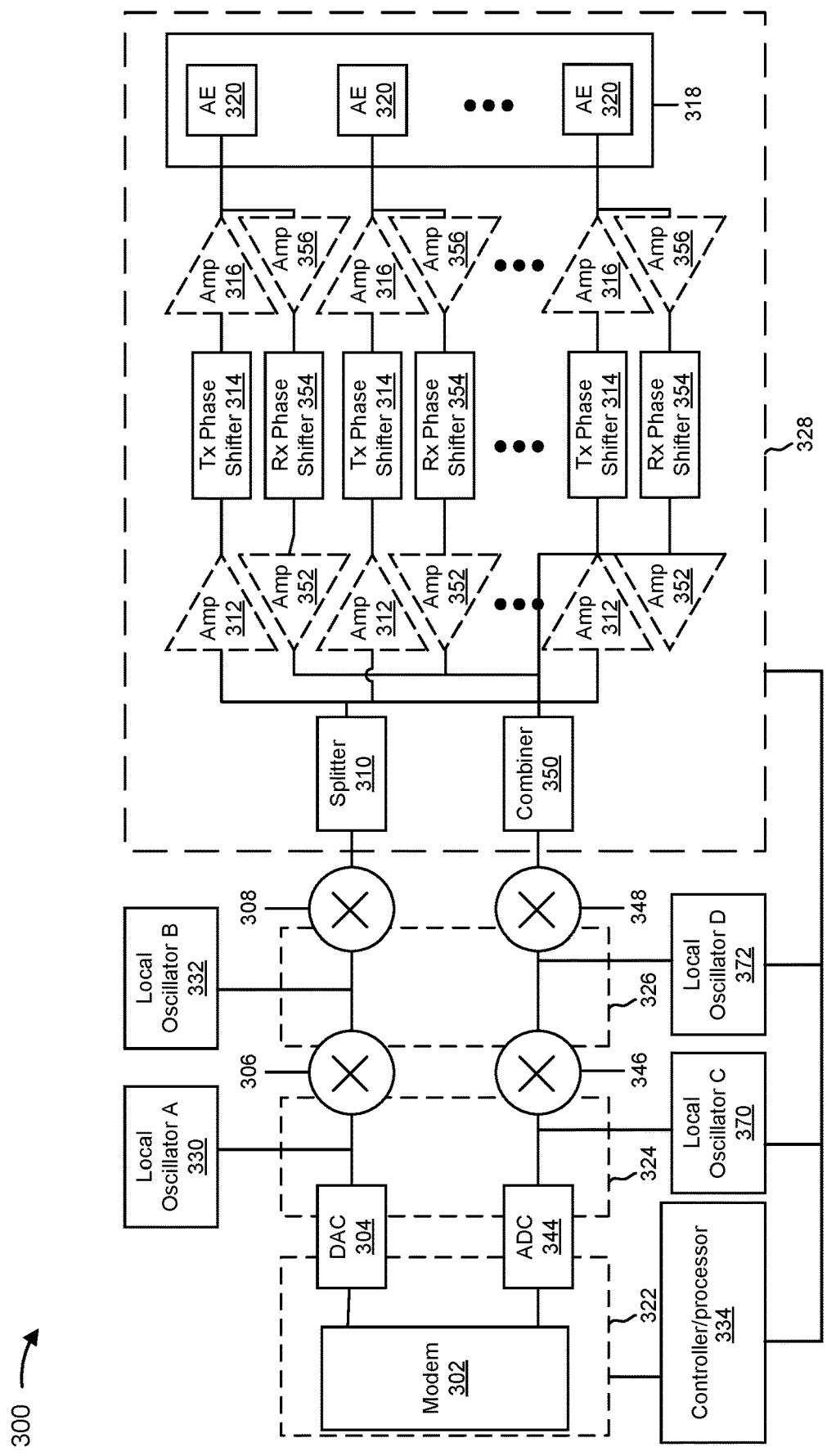
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a wireless communication device such as a UE 120 or a base station 110) and/or a receiving device (e.g., another wireless communication device such as a UE 120 or a base station 110), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam, such as a transmit beam for transmitting a communication or a receive beam for receiving a communication). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

A phase weight may be used by the architecture 300 when generating a transmit (Tx) beam to generate a transmit beam having a particular phase shift or phase offset. A phase weight includes a magnitude and direction of a phase shift or a phase offset that is to be applied by one or more phase shifters 314 to a transmit beam when the architecture 300 of a wireless communication device forms the transmit beam. For example, a phase weight of 180 may enable the formation of a transmit beam having a 180 degree phase shift, whereas a phase weight of −180 may enable the formation of a transmit beam having a −180 degree phase shift. In some aspects, one or more phase shifters 314 may apply a plurality of phase weights when forming a transmit beam. Each phase weight may be applied to a respective antenna element 320. As an example, if four antenna elements 320 are used to generate a transmit beam, a phase shifter 314 (or a plurality of phase shifters 314) may apply a respective phase weight (e.g., for a total of four phase weights). A plurality of weights can be used to configure a spatial direction of a transmit beam, to configure and/or shape a primary lobe of the transmit beam, to configure and/or shape one or more secondary lobes of the transmit beam, and/or to configure other properties of the transmit beam.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more receive (Rx) beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 are input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a transmit beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
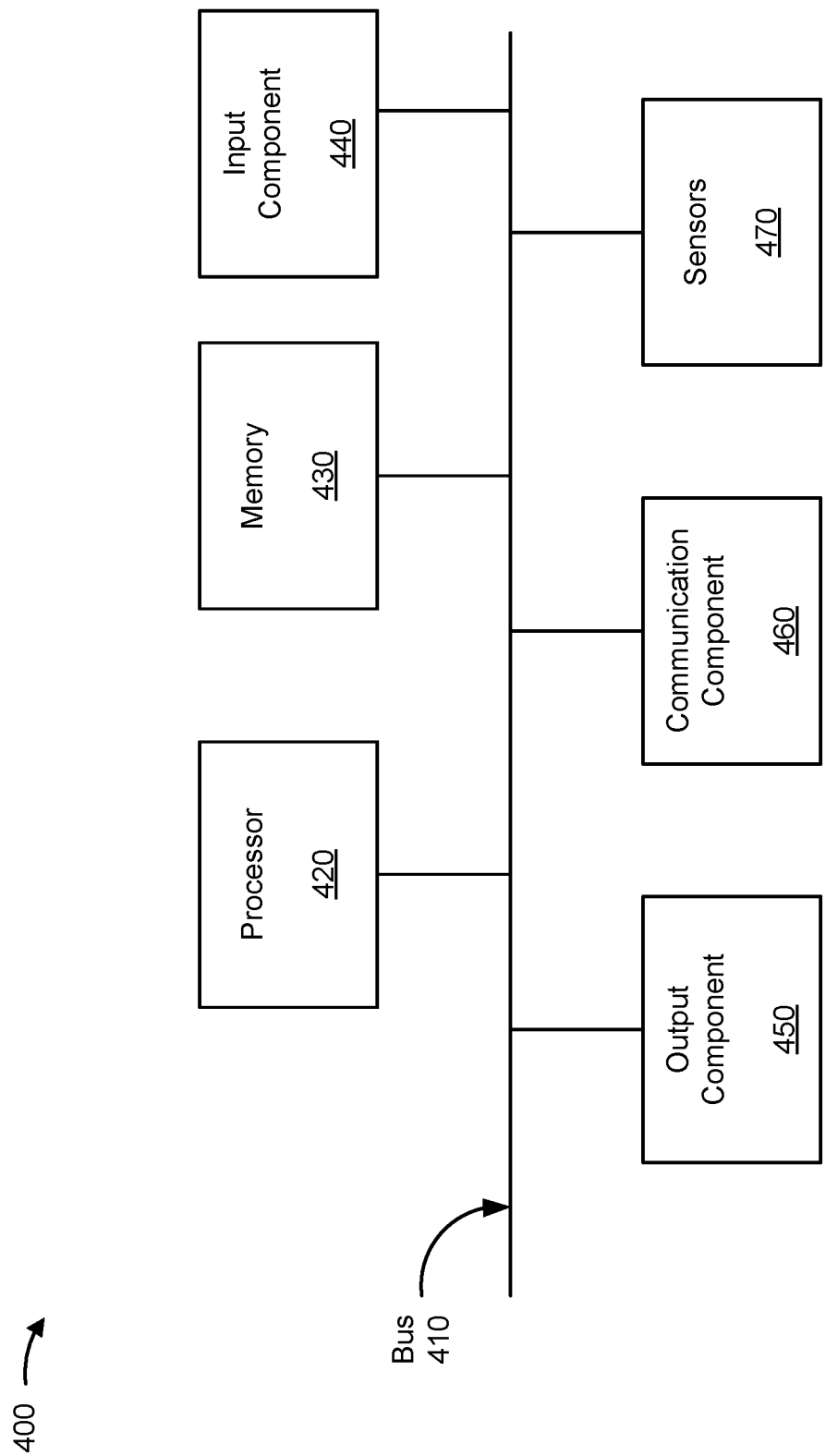
FIG. 4 is a diagram of example components of a device, in accordance with the present disclosure.

FIG. 4 is a diagram of example components of a device 400, in accordance with the present disclosure. In some aspects, the device 400 may be included in a test lab or a production facility. As shown in FIG. 4, device 400 may include a bus 410, a processor 420, a memory 430, an input component 440, an output component 450, and a communication component 460. One or more of the components of the device 400 may be configured to generate electric field measurements of one or more antenna elements 320 of a wireless communication device, may be configured to generate one or more codebooks based at least in part on the electric field measurements, and/or may be configured to perform one or more other actions described herein. In some aspects, the device 400 may communicate with a wireless communication device (e.g., a UE 120, a base station 110) to provide one or more codebooks, as described herein.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

The sensors 470 may include one or more antennas, one or more antenna elements, one or more antenna arrays, and/or one or more electric field proximity sensing device, and/or one or more other components that are configured to generate one or more types of electronic signals (e.g., a current, a voltage) based at least in part on an electric field radiated by a wireless communication device (e.g., a UE 120, a base station 110). The processor 420, the memory 430, and/or another component of the device 400 may generate an electric field characterization of the electric field based at least in part on the electronic signals. The processor 420, the memory 430, and/or another component of the device 400 may generate one or more codebooks for the wireless communication device based at least in part on the electric field characterization, for example, to achieve a flat and/or uniform frequency response (or to increase the flatness and uniformity of the frequency response) for communication by the wireless communication in a particular frequency band of a wireless network (e.g., the wireless network 100).

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

In some aspects, the device 400 includes means for generating a plurality of electric field measurements for each frequency of a plurality of frequencies included in a frequency band associated with a wireless communication device (e.g., a UE 120, a base station 110), wherein each electric field measurement of the plurality of electric field measurements is associated with a respective frequency of the plurality of frequencies; means for generating a codebook for the frequency band based at least in part on a first electric field measurement, of the plurality of electric field measurements, associated with a first frequency of the plurality of frequencies; and/or means for generating respective scaling factors for each of a plurality of second frequencies of the plurality of frequencies based at least in part on respective electric field measurements, of the plurality of electric field measurements, associated with each of the plurality of second frequencies. In some aspects, the means for the device 400 to perform operations described herein may include, for example, one or more of the processor 420, the memory 430, the input component 440, the output component 450, or the communication component 460, and/or the sensors 470.

In some aspects, the device 400 includes means for generating respective electric field measurements for each frequency of a plurality of frequencies included in a frequency band associated with a wireless communication device; and/or means for generating a codebook for the frequency band based at least in part on the respective electric field measurements. In some aspects, the means for the device 400 to perform operations described herein may include, for example, one or more of the processor 420, the memory 430, the input component 440, the output component 450, the communication component 460, and/or the sensors 470.

In some aspects, the device includes means for generating respective electric field measurements for each frequency of a plurality of frequencies included in a frequency band associated with a wireless communication device; and/or means for generating respective codebooks for each frequency of the plurality of frequencies included in the frequency band based at least in part on the respective electric field measurements. In some aspects, the means for the device 400 to perform operations described herein may include, for example, one or more of the processor 420, the memory 430, the input component 440, the output component 450, the communication component 460, and/or the sensors 470.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

As described above in connection with FIG. 3, a wireless communication device (e.g., a UE, a base station) may use one or more transmit beams to transmit a wireless communication in a wireless network. In some cases, a wireless communication device may generate a transmit beam based at least in part on a codebook. A codebook includes a data structure that includes information associated with one or more frequency bands (e.g., 5G NR FR1 frequency bands such as n7 and n48, among other examples; 5G NR FR2 frequency bands such as n256 and n257, among other examples; LTE frequency bands such as band 04 and band 46, among other examples) on which a wireless communication device may communicate in a wireless network. The frequency bands may be based at least in part on a wireless carrier for which the wireless communication device is configured, may be based at least in part on a plurality of wireless carriers for which the wireless communication device is compatible, and/or may be based at least in part on another factor. As an example, a codebook for a wireless communication device may include information associated with one or more frequency bands operated by a wireless carrier in a wireless network for which the wireless communication device is to be deployed.

The information included in a codebook for a frequency band may include antenna identifiers associated with the antenna elements of the wireless communication device, antenna group identifiers associated with groups of antenna elements of the wireless communication device, amplitude values for the antenna elements, phase weights for the antenna elements, and/or other parameters. Each frequency band on which the wireless communication device is capable of communicating (or for which the wireless communication device is to use in a particular wireless carrier deployment) may include a dedicated set of information in the codebook.

The information included in a codebook for a frequency band may include a table of information that is arranged according to beam identifiers, which are identifiers that are associated with beams (e.g., transmit beams, receive beams) that the wireless communication device may use for wireless communication in the frequency band. For example, a beam identifier 0 may include a combination of parameters such as one or more antenna elements, one or more amplitudes, and/or one or more phase weights, among other parameters; a beam identifier 1 may include another combination of parameters such as one or more antenna elements, one or more amplitudes, and/or one or more phase weights, among other parameters; a beam identifier 2 may include another combination of parameters such as one or more antenna elements, one or more amplitudes, and/or one or more phase weights, among other parameters; and so on. As described above, a phase weight may be used when generating a transmit beam to generate a transmit beam having a particular phase shift or phase offset.

A frequency band may be segmented or divided into a plurality of frequencies or subranges of frequencies referred to as frequency channels. Each frequency channel may include a channel bandwidth, which refers to the frequency range of the frequency channel. For example, a frequency band may be configured with frequency channels having a 50 megahertz (Mhz) bandwidth (or another bandwidth) such that each frequency channel spans a 50 Mhz continuous frequency range in the frequency band.

In some cases, the frequency response of the antenna elements of a wireless communication device may be variable and/or nonuniform across a plurality of frequencies or frequency channels on a frequency band. For example, the effective isotropic radiated power (EIRP) of the antenna elements of the wireless communication device may be greater in some frequencies and/or in some frequency channels relative to other frequencies and/or other frequency channels in the frequency band. As another example, the error vector magnitude (EVM) percentage for the antenna elements of the wireless communication device may be greater in some frequencies and/or in some frequency channels relative to other frequencies and/or other frequency channels in the frequency band.

A variable and/or nonuniform frequency response may result in inconsistent wireless communication performance across the frequencies and/or frequency channels in a frequency band for a wireless communication device. For example, the wireless communication device may experience greater power consumption in some frequencies and/or in some frequency channels relative to other frequencies and/or other frequency channels in the frequency band due to the variable and/or nonuniform frequency response because the wireless communication device needs to consume a greater amount of power to transmit with a similar transmit power across the frequency band. As another example, the wireless communication device may experience a greater amount of communication errors (e.g., dropped communications, undecodable communications) in some frequencies and/or in some frequency channels relative to other frequencies and/or other frequency channels in the frequency band due to the variable and/or nonuniform frequency response.

Some aspects described herein provide techniques for codebook generation for flattening and/or increasing uniformity in frequency response of a wireless communication device to increase the wireless communication performance of the wireless communication device across a plurality of frequencies and/or frequency channels in a frequency band.

In some aspects, the wireless communication device may be configured with a plurality of codebooks for a plurality of frequencies or a plurality of frequency channels in a frequency band. This enables the wireless communication device to select a codebook that is optimized for a particular frequency or frequency channel, which may increase the uniformity in frequency response of a wireless communication device.

In some aspects, the wireless communication device may be configured with a codebook that is generated based at least in part on electric field characterizations of a plurality of frequencies or a plurality of frequency channels in a frequency band. This may increase the uniformity in frequency response of a wireless communication device relative to the use of a codebook that is generated based at least in part on a single electric field characterization of a single frequency or frequency channel of the frequency band (e.g., a middle frequency or center channel of the frequency band).

In some aspects, the wireless communication device may be configured with a plurality of scaling factors that are generated based at least in part on electric field characterizations of a plurality of frequencies or a plurality of frequency channels in a frequency band. The wireless communication device may use the scaling factors to modify the phase weights in a codebook for the frequency band to increase the uniformity in frequency response of a wireless communication device relative to the use of a codebook without scaling factors.

The techniques described herein may flatten and/or increase the uniformity of the frequency response of the antenna elements of a wireless communication device, which may increase the consistency of wireless communication performance across the frequencies and/or frequency channels in a frequency band for the wireless communication device. For example, the techniques described herein may reduce power consumption across the frequencies and/or the frequency channels in the frequency band due to the increased uniformity of the frequency response. As another example, the techniques described herein may reduce the amount of communication errors (e.g., dropped communications, undecodable communications) across the frequencies and/or the frequency channels in the frequency band due to the increased uniformity of the frequency response.

Figure 5:
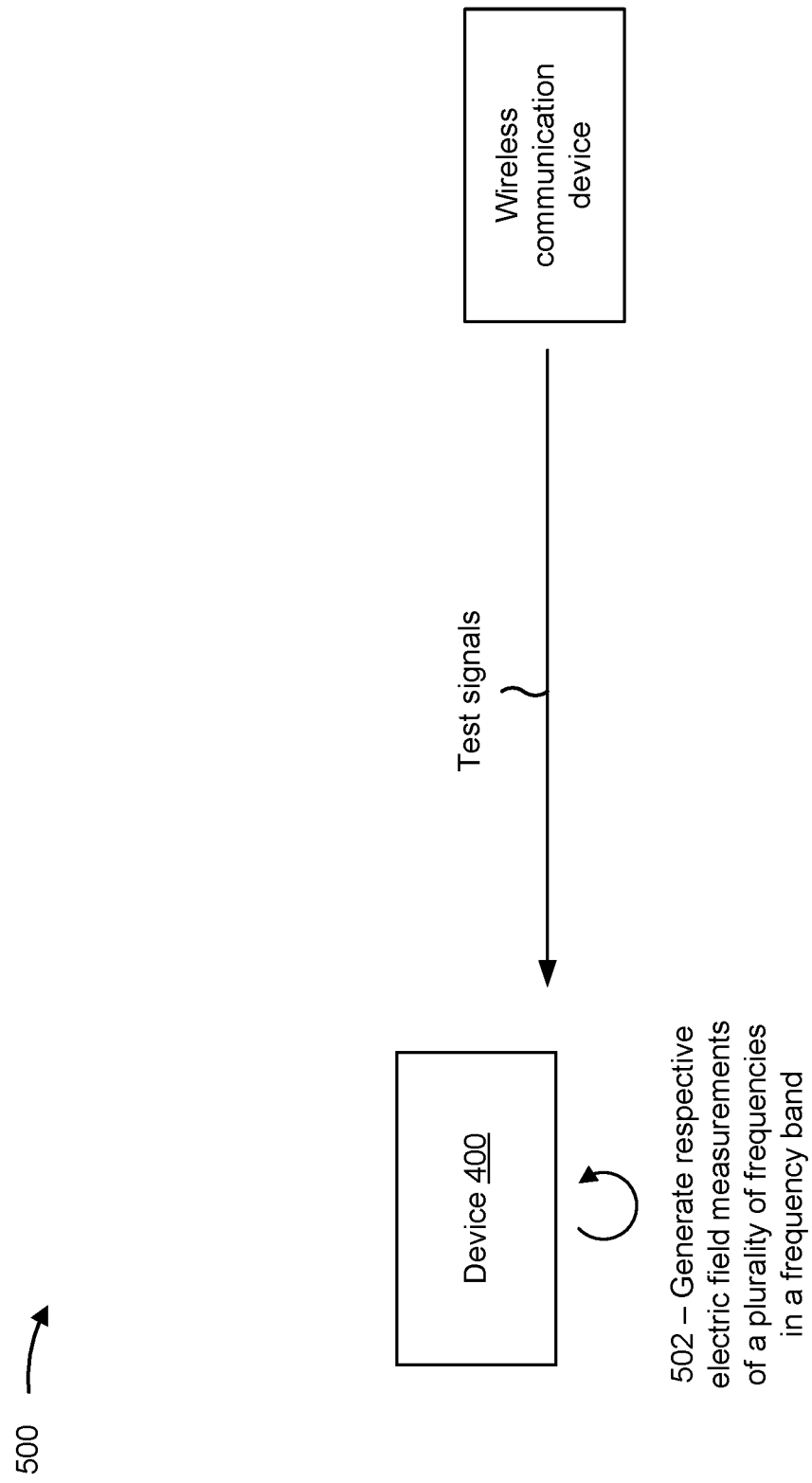
FIG. 5 is a diagram illustrating an example associated with generating electric field measurements associated with a wireless communication device, in accordance with the present disclosure.

FIG. 5 is a diagram illustrating an example 500 associated with generating electric field measurements associated with a wireless communication device, in accordance with the present disclosure. As shown in FIG. 5, the example 500 may include a device 400 and a wireless communication device such as a UE 120 or a base station 110. The operations described in connection with FIG. 5 may be performed in a lab environment, a production environment, a testing environment, or in another environment prior to deployment of the wireless communication device into a wireless network. Additionally and/or alternatively, the operations described in connection with FIG. 5 may be performed in the field (e.g., where the wireless communication device is deployed in a wireless network such as the wireless network 100).

As shown in FIG. 5, the wireless communication device may be configured to transmit test signals. The test signals may include wireless communications that are transmitted using one or more transmit beams. At 502, the device 400 may measure the test signals and may generate respective electric field measurements for a plurality of frequencies in a frequency band. The plurality of frequencies may include singular frequencies, frequency sub-ranges, frequency channels, and/or another type of frequencies included in the frequency band.

An electric field measurement for a particular frequency may include a measurement of one or more parameters of the electric field radiated by the wireless communication device when transmitting a test signal on the particular frequency. The one or more parameters may include a field strength, an EIRP, and/or another parameter. The device 400 may use the sensors 470, the processor 420, the memory 430, and/or another component to generate the respective electric field measurements.

The device 400 may generate electric field characterizations based at least in part on the respective electric field measurements generated at 502. For example, an electric field characterization may be associated with a 25.8 gigahertz (GHz) frequency channel in an n257 frequency band that the device 400 generates based at least in part on an electric field measurement of the 25.8 GHz frequency channel. As another example, an electric field characterization may be associated with a 28 GHz frequency channel in an n257 frequency band that the device 400 generates based at least in part on an electric field measurement of the 28 GHz frequency channel. Electric field characterizations may be generated for other frequencies and/or other frequency ranges.

In some aspects, the electric field characterization for a particular frequency or frequency channel may be different for different wireless communication devices. The electric field measurements, and the resulting electric field characterizations, for a wireless communication device may be based at least in part on the form factor of the wireless communication device (e.g., the size of the wireless communication device, the shape of the wireless communication device), the quantity of antenna elements 320 included in the wireless communication device, the types of antenna elements 320 included in the wireless communication, the placement and/or position of the antenna elements 320 included in the wireless communication, and/or the orientation of the antenna elements 320 included in the wireless communication, among other examples.

As indicated above, FIG. 5 is provided as an example. Other examples may differ from what is described with regard to FIG. 5.

Figure 6:
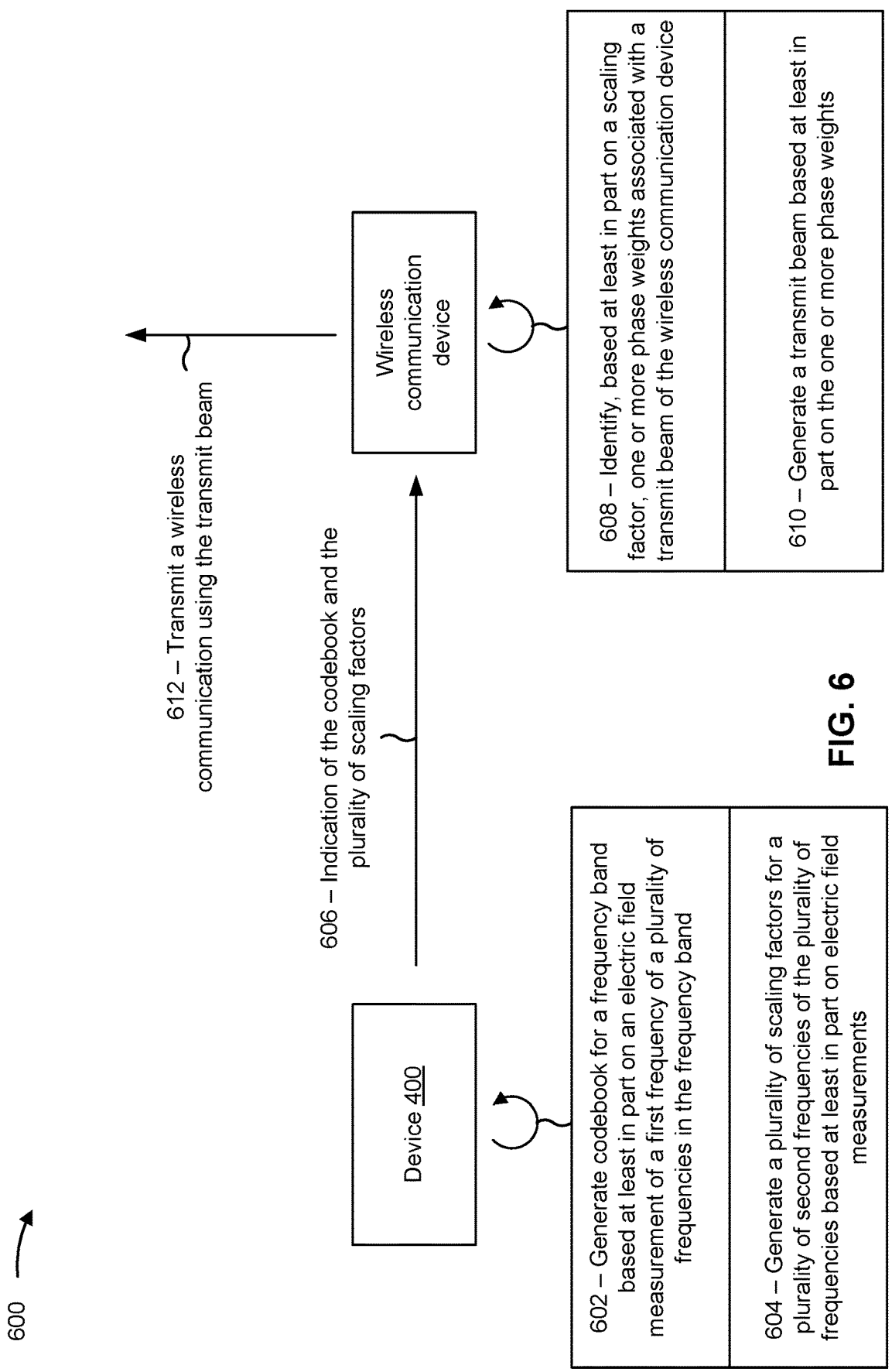
FIGS. 6-8 are diagrams illustrating examples associated with generating a transmit beam, in accordance with the present disclosure.

FIG. 6 is a diagram illustrating an example 600 associated with generating a transmit beam, in accordance with the present disclosure. The example 600 includes an example in which a transmit beam may be generated based at least in part on a codebook and one or more scaling factors.

At 602, the device 400 may generate a codebook for a frequency band. The frequency band may include a frequency band on which the wireless communication device is capable of communicating, a frequency band associated with a wireless carrier for which the wireless communication device is to be deployed, and/or another frequency band. The device 400 may generate the codebook based at least in part on an electric field measurement (e.g., generated as described above in connection with FIG. 5) of a first frequency of a plurality of frequencies in the frequency band. The first frequency may include a middle frequency or a center channel of the frequency band or may include another frequency of the frequency band.

The device 400 may generate the codebook to include respective sets of parameters for a plurality of beams (e.g., transmit beams, receive beams) for the frequency band. Each beam may be associated with a combination of parameters such as a quantity of antenna elements 320 for the beam, amplitudes for the antenna elements 320, and/or phase weights for the antenna elements, among other examples.

At 604, the device 400 may generate a plurality of scaling factors for a plurality of second frequencies of the plurality of frequencies included in the frequency band. Each scaling factor may be associated with a particular frequency or frequency channel (e.g., other than the first frequency) in the frequency band. The scaling factor may be used by the wireless communication device to scale or modify the phase weights for the antenna elements 320 for different frequencies in the frequency band. Modifying the phase weights using the scaling factors enables the wireless communication device to generate transmit beams in a manner that flattens and/or increases the uniformity of the frequency response of the antenna elements 320 across the frequencies or frequency channels in the frequency band. Moreover, the scaling factors reduce memory consumption of the wireless communication device in that the wireless communication device can use the scaling factors to modify the codebook parameters for different frequencies without having to store separate codebooks for each of the different frequencies.

A scaling factor may include a value that increases or decreases a phase weight associated with an antenna element 320 of the wireless communication device. For example, a scaling factor of 0.3 may be used to modify a phase weight of 360 degrees to achieve a 108 degree phase weight. The device 400 may determine or identify one or more scaling factors for a frequency or a frequency channel in a frequency band based at least in part on a frequency response (or an estimated or measured frequency response) of one or more antenna elements 320 of the wireless communication device or on the frequency or the frequency channel. In particular, the device 400 may determine or identify a frequency response of the frequency or the frequency channel based at least in part on one or more phase weights indicated in the codebook (e.g., which were determined or identified based at least in part on a different frequency or a different frequency channel). The device 400 may use the characterization of the frequency response to determine or identify the scaling factor(s) for the frequency or the frequency channel such that the resulting phase weights for the frequency or the frequency channel contributes to an approximately flat and uniform frequency response across the frequency band. The device 400 may determine the scaling factor(s) for other frequencies or other frequency channels in the frequency band in a similar manner to achieve a flat and uniform frequency response across the frequency band. Moreover, the device 400 may determine scaling factor(s) for frequencies or frequency channels in other frequency bands for the wireless communication device in a similar manner to achieve a flat and uniform frequency response across the other frequency bands.

At 606, the device 400 may provide an indication of the codebook and the scaling factors to the wireless communication device. The device 400 may provide the indication of the codebook and the scaling factors to the wireless communication device via a wireless communication interface and/or a wired communication interface.

At 608, the wireless communication device may identify, based at least in part on a scaling factor, one or more phase weights associated with a transmit beam of the wireless communication device. The scaling factor may be included in the plurality of scaling factors for the frequency band received from the device 400. The wireless communication may identify the scaling factor based at least in part on the scaling factor being associated with a frequency in the frequency band associated with the wireless communication device. The frequency may include a frequency or a frequency channel on which the wireless communication device is to transmit a wireless communication using the transmit beam.

The wireless communication device may identify the one or more phase weights by modifying one or more phase weights in the codebook provided by the device 400 based at least in part on the one or more scaling factors. The quantity of scaling factors and the quantity of phase weights identified by the wireless communication device may be based at least in part on the combination of parameters for the transmit beam and the frequency as indicated in the codebook.

In some aspects, the wireless communication may determine the scaling factor(s) to use based at least in part on an uplink configuration associated with the wireless communication device, a downlink configuration associated with the wireless communication device, and/or another configuration associated with the wireless communication device. In some aspects, the wireless communication device may determine which scaling factor(s) to use based at least in part on an uplink carrier aggregation configuration and/or a downlink carrier aggregation configuration associated with the wireless communication device. In some aspects, the wireless communication device may determine which scaling factor(s) to use based at least in part on scheduling information associated with the wireless communication device (e.g., uplink scheduling information, downlink scheduling information). In some aspects, the wireless communication device may determine which scaling factor(s) to use to provide greater phase weights for frequencies or carriers for which a greater quantity of wireless communications is scheduled relative to phase weights for frequencies or carriers for which a lesser quantity of wireless communications is scheduled.

At 610, the wireless communication device may generate the transmit beam based at least in part on the phase weight(s) (e.g., after modifying the phase weight(s) in the codebook based at least in part on the one or more scaling factors). For example, one or more of the Tx phase shifters 314 may apply the phase weights to the transmit beam to phase shift of the transmit beam.

At 612, the wireless communication may transmit a wireless communication using the transmit beam. For example, the wireless communication may transmit the wireless communication to another wireless communication device (e.g., a UE 120 or a base station 110) using the transmit beam.

As indicated above, FIG. 6 is provided as an example. Other examples may differ from what is described with regard to FIG. 6. Moreover, the device 400 may perform similar techniques for one or more other wireless communication devices such that codebooks and associates scaling factors are generated specifically for particular wireless communication devices.

Figure 7:
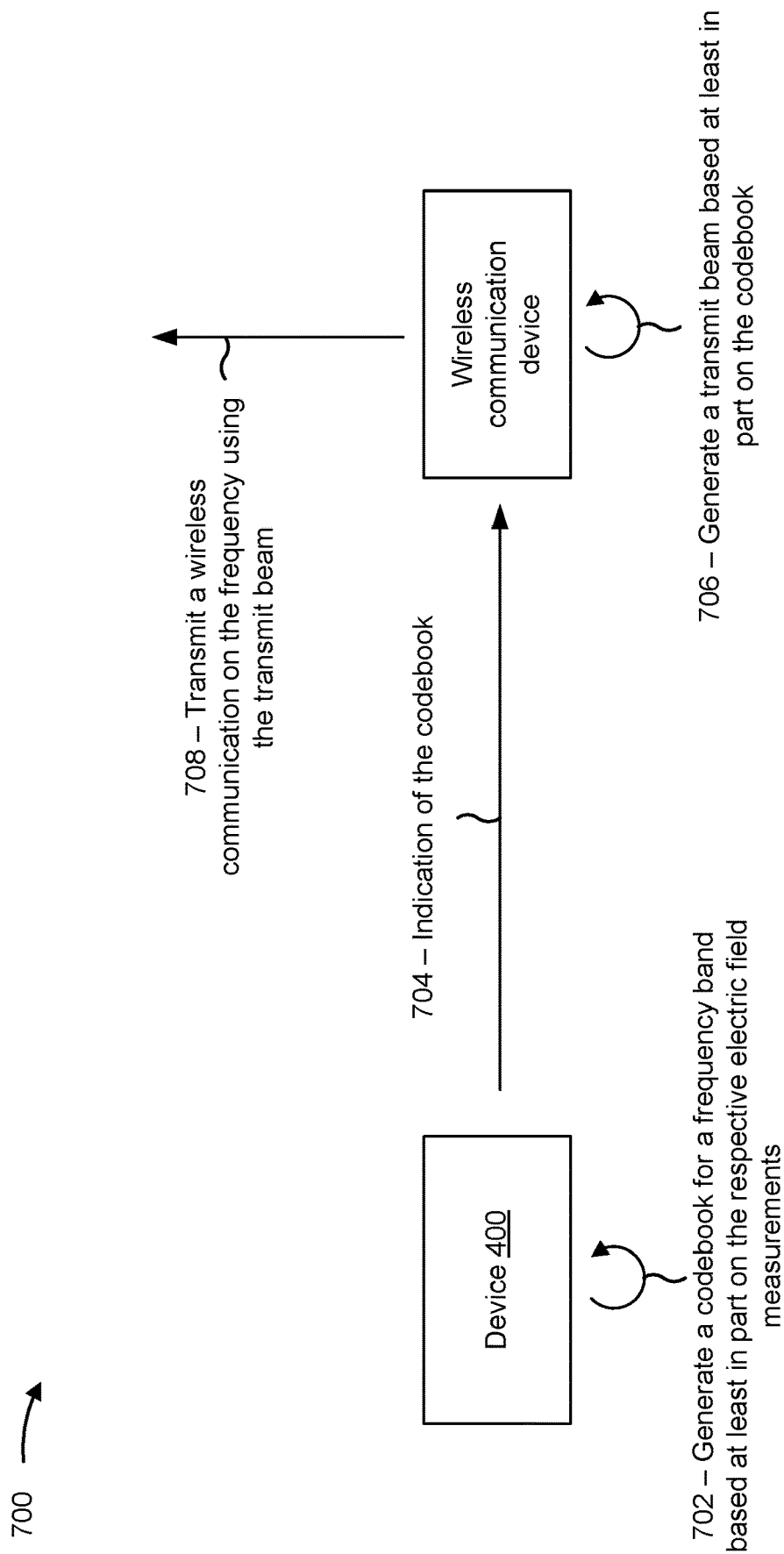

FIG. 7 is a diagram illustrating an example 700 associated with generating a transmit beam, in accordance with the present disclosure. The example 700 includes an example in which a transmit beam may be generated based at least in part on a codebook that is generated based at least in part on a plurality of electric field measurements for a plurality of frequencies included in a frequency band.

At 702, the device 400 may generate a codebook for a frequency band. The frequency band may include a frequency band on which the wireless communication device is capable of communicating, a frequency band associated with a wireless carrier for which the wireless communication device is to be deployed, and/or another frequency band. The device 400 may generate the codebook based at least in part on the respective electric field measurements described above in connection with FIG. 5 (e.g., respective electric field measurements for each of a plurality of frequencies included in the frequency band).

The device 400 may generate the codebook to include respective sets of parameters for a plurality of beams (e.g., transmit beams, receive beams) for the frequency band. Each beam may be associated with a combination of parameters such as a quantity of antenna elements 320 for the beam, amplitudes for the antenna elements 320, and/or phase weights for the antenna elements, among other examples.

The device 400 may generate the codebook based at least in part on the respective electric field measurements such that the parameters of the codebook optimize the frequency response (e.g., flattens and/or increases the uniformity of the frequency response) across the frequency band relative to using a single electric field measurement for a single frequency in the frequency band to generate the codebook. For example, the device 400 may determine or identify phase weights (or combinations of phase weights) to optimize the frequency response. As another example, the device 400 may determine or identify antenna elements (or combinations of antenna elements) to optimize the frequency response. As another example, the device 400 may determine or identify amplitudes (or combinations of amplitudes) to optimize the frequency response.

At 704, the device 400 may provide an indication of the codebook to the wireless communication device. The device 400 may provide the indication of the codebook to the wireless communication device via a wireless communication interface and/or a wired communication interface.

At 706, the wireless communication device may generate the transmit beam based at least in part on the codebook. At 708, the wireless communication may transmit a wireless communication using the transmit beam. For example, the wireless communication may transmit the wireless communication to another wireless communication device (e.g., a UE 120 or a base station 110) using the transmit beam.

As indicated above, FIG. 7 is provided as an example. Other examples may differ from what is described with regard to FIG. 7. Moreover, the device 400 may perform similar techniques for one or more other wireless communication devices such that codebooks are generated specifically for particular wireless communication devices.

Figure 8:
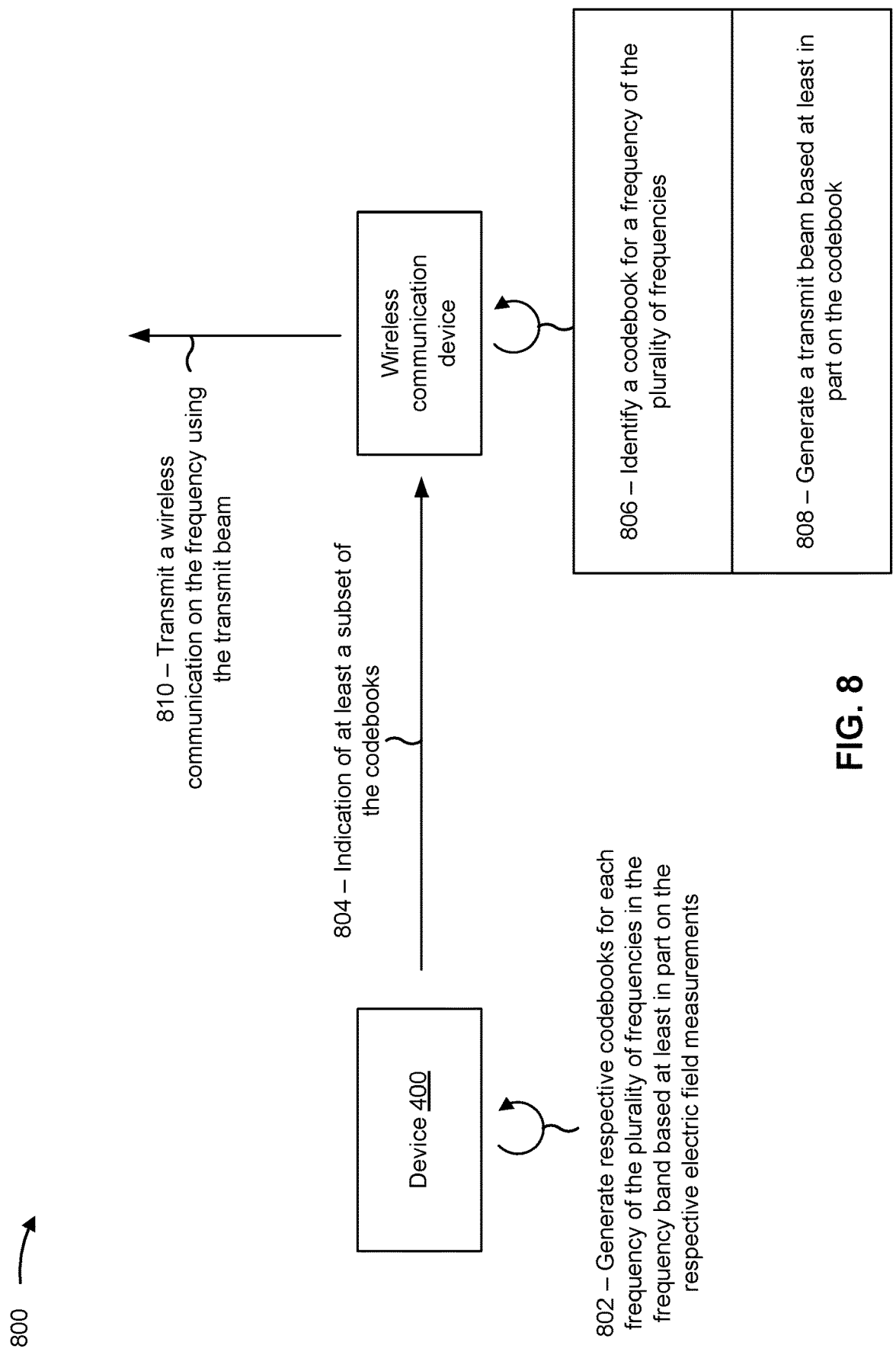

FIG. 8 is a diagram illustrating an example 800 associated with generating a transmit beam, in accordance with the present disclosure. The example 800 includes an example in which a transmit beam may be generated based at least in part on a codebook among a plurality of codebooks stored by a wireless communication device. Each of the plurality of codebooks is generated based at least in part on a respective electric field measurement for a plurality of frequencies included in a frequency band.

At 802, the device 400 may generate respective codebooks for each of a plurality of frequencies or frequency channels in a frequency band. The frequency band may include a frequency band on which the wireless communication device is capable of communicating, a frequency band associated with a wireless carrier for which the wireless communication device is to be deployed, and/or another frequency band. The device 400 may generate each codebook based at least in part on the respective electric field measurements described above in connection with FIG. 5 (e.g., respective electric field measurements for each of a plurality of frequencies included in the frequency band). For example, the device 400 may generate a first codebook for a first frequency or a first frequency channel included in the frequency band based at least in part on an electric field measurement associated with (and specific to) the first frequency, the device 400 may generate a second codebook for a second frequency or a second frequency channel included in the frequency band based at least in part on an electric field measurement associated with (and specific to) the second frequency, and so on. The device 400 may generate respective sets of codebooks for each frequency band for the wireless communication device in a similar manner.

The device 400 may generate a codebook to include respective sets of parameters for a plurality of beams (e.g., transmit beams, receive beams) for an associated frequency or frequency channel in the frequency band. Each beam may be associated with a combination of parameters such as a quantity of antenna elements 320 for the beam, amplitudes for the antenna elements 320, and/or phase weights for the antenna elements, among other examples.

The device 400 may generate the plurality of codebooks such that the parameters of the codebooks optimize the frequency response (e.g., flattens and/or increases the uniformity of the frequency response) across the frequency band relative to using a single codebook that is generated based on a single electric field measurement for a single frequency in the frequency band. For example, the device 400 may determine or identify phase weights (or combinations of phase weights) for each codebook to optimize the frequency response. As another example, the device 400 may determine or identify antenna elements (or combinations of antenna elements) for each codebook to optimize the frequency response. As another example, the device 400 may determine or identify amplitudes (or combinations of amplitudes) for each codebook to optimize the frequency response.

At 804, the device 400 may provide an indication of at least a subset of the codebooks to the wireless communication device. The device 400 may provide the indication of at least a subset of the codebooks to the wireless communication device via a wireless communication interface and/or a wired communication interface. In some aspects, the device 400 provides sets of codebooks for each frequency band that the wireless communication device is capable of using. In some aspects, the device 400 provides sets of codebooks for only the frequency bands that the wireless communication device will use in a particular deployment, which may be fewer frequency bands than the wireless device is capable of using. As an example, a wireless carrier may operate on only a subset of frequency bands that the wireless communication device is capable of using. Accordingly, the device 400 may provide sets of codebooks for only the subset of frequency bands to reduce memory consumption of the wireless communication device.

At 806, the wireless communication may identify a codebook for a frequency or a frequency channel of the plurality of frequencies in the frequency band. In particular, the wireless communication device may identify the codebook, among the plurality of codebooks stored by the wireless communication device, that is associated and was generated for the frequency or the frequency channel.

At 808, the wireless communication device may generate the transmit beam based at least in part on the codebook. At 810, the wireless communication may transmit a wireless communication using the transmit beam. For example, the wireless communication may transmit the wireless communication to another wireless communication device (e.g., a UE 120 or a base station 110) using the transmit beam.

As indicated above, FIG. 8 is provided as an example. Other examples may differ from what is described with regard to FIG. 8. Moreover, the device 400 may perform similar techniques for one or more other wireless communication devices such that sets of codebooks are generated specifically for particular wireless communication devices.

Figure 9:
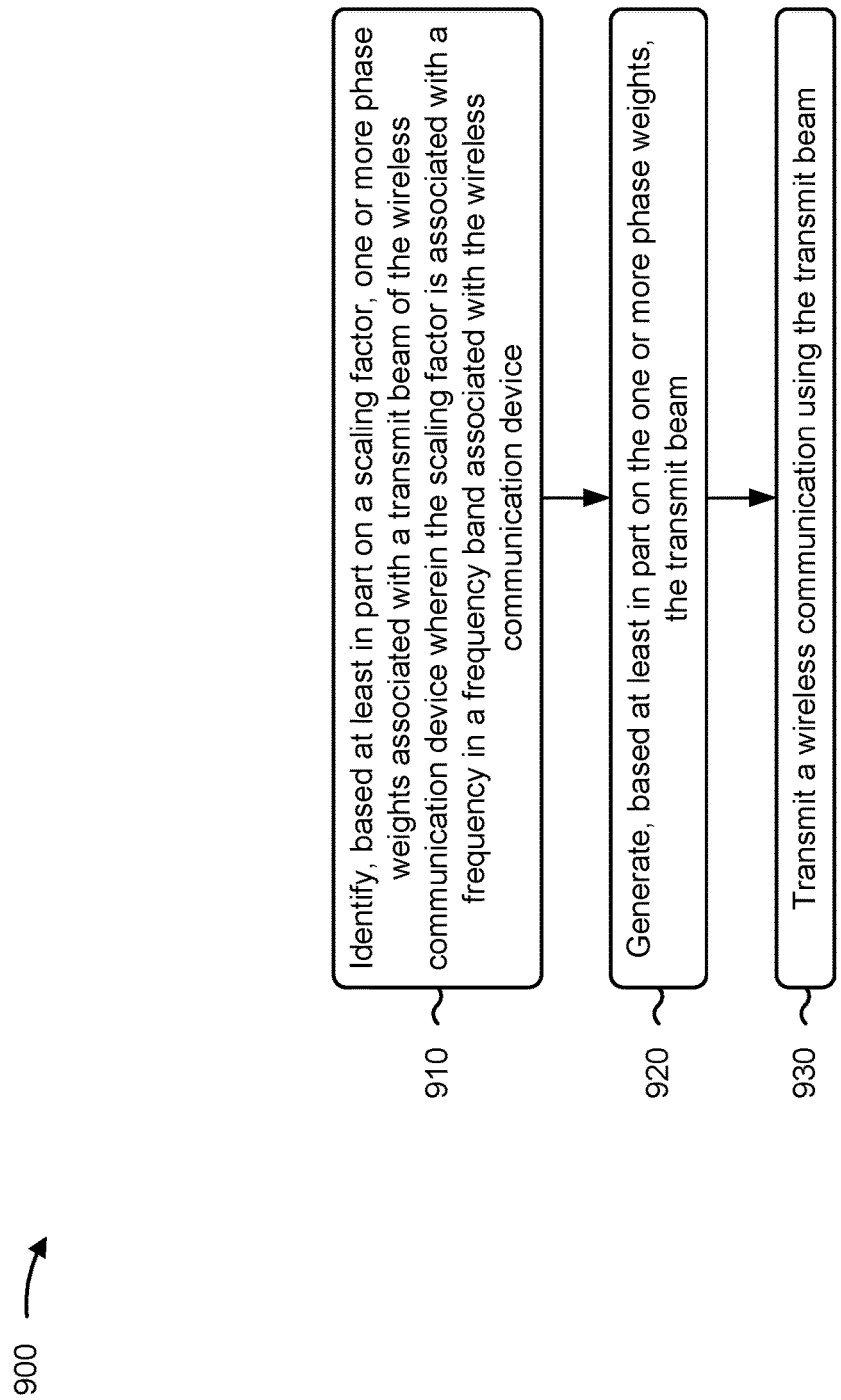
FIG. 9 is a diagram illustrating an example process associated with generating a transmit beam, in accordance with the present disclosure.

FIG. 9 is a diagram illustrating an example process 900 performed, for example, by a wireless communication device, in accordance with the present disclosure. Example process 900 is an example where the wireless communication device (e.g., a UE 120, a base station 110) performs operations associated with generating a transmit beam.

As shown in FIG. 9, in some aspects, process 900 may include identifying, based at least in part on a scaling factor, one or more phase weights associated with a transmit beam of the wireless communication device, wherein the scaling factor is associated with a frequency in a frequency band associated with the wireless communication device (block 910). For example, the wireless communication device (e.g., using communication manager 140, communication manager 150, communication manager 1408 depicted in FIG. 14, communication manager 1508 depicted in FIG. 15, identification component 1410 depicted in FIG. 14, and/or identification component 1510 depicted in FIG. 15) may identify, based at least in part on a scaling factor, one or more phase weights associated with a transmit beam of the wireless communication device, wherein the scaling factor is associated with a frequency in a frequency band associated with the wireless communication device, as described above. In some aspects, the scaling factor is associated with a frequency in a frequency band associated with the wireless communication device.

As further shown in FIG. 9, in some aspects, process 900 may include generating, based at least in part on the one or more phase weights, the transmit beam (block 920). For example, the wireless communication device (e.g., using communication manager 140, communication manager 150, communication manager 1408 depicted in FIG. 14, communication manager 1508 depicted in FIG. 15, generation component 1412 depicted in FIG. 14, and/or generation component 1512 depicted in FIG. 15) may generate, based at least in part on the one or more phase weights, the transmit beam, as described above.

As further shown in FIG. 9, in some aspects, process 900 may include transmitting a wireless communication using the transmit beam (block 930). For example, the wireless communication device (e.g., using communication manager 140, communication manager 150, communication manager 1408 depicted in FIG. 14, communication manager 1508 depicted in FIG. 15, transmission component 1404 depicted in FIG. 14, and/or transmission component 1504 depicted in FIG. 15) may transmit a wireless communication using the transmit beam, as described above.

Process 900 may include additional aspects, such as any single aspect or any combination of aspects described below and/or in connection with one or more other processes described elsewhere herein.

In a first aspect, the frequency comprises a first frequency, wherein the one or more phase weights are associated with a second frequency among the plurality of frequencies in the frequency band, and wherein the first frequency and the second frequency are different frequencies.

In a second aspect, alone or in combination with the first aspect, the scaling factor is based at least in part on a characterization of a first frequency response, of one or more antenna elements of the wireless communication device, on the first frequency, and the one or more phase weights are based at least in part on a characterization of a second frequency response, of the one or more antenna elements, on the second frequency.

In a third aspect, alone or in combination with one or more of the first and second aspects, the scaling factor comprises a combination of a plurality of scaling factors, and each scaling factor of the plurality of scaling factors is associated with a respective frequency of the plurality of frequencies.

In a fourth aspect, alone or in combination with one or more of the first through third aspects, process 900 includes determining the scaling factor based at least in part on at least one of an uplink configuration associated with the wireless communication device, or a downlink configuration associated with the wireless communication device.

In a fifth aspect, alone or in combination with one or more of the first through fourth aspects, process 900 includes determining the scaling factor based at least in part on an uplink carrier aggregation configuration.

In a sixth aspect, alone or in combination with one or more of the first through fifth aspects, process 900 includes determining the scaling factor based at least in part on scheduling information associated with the wireless communication device.

In a seventh aspect, alone or in combination with one or more of the first through sixth aspects, process 900 includes determining the scaling factor to provide greater phase weights for frequencies or carriers for which a greater quantity of wireless communications is scheduled relative to phase weights for frequencies or carriers for which a lesser quantity of wireless communications is scheduled.

In an eighth aspect, alone or in combination with one or more of the first through seventh aspects, process 900 includes determining the scaling factor from among a plurality of scaling factors associated with the plurality of frequencies, wherein each frequency of the plurality of frequencies is associated with a respective channel of a plurality of channels of the frequency band.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
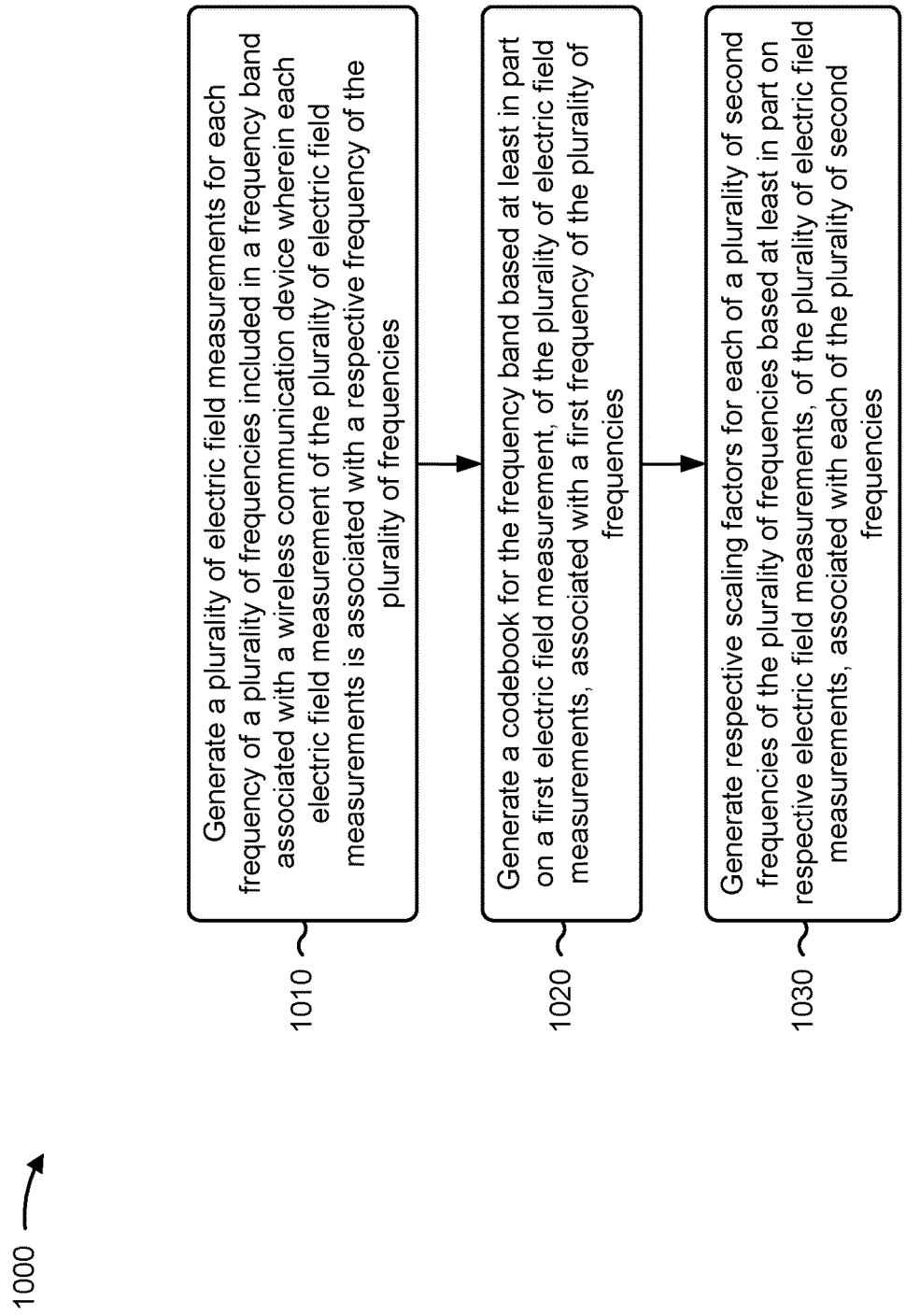
FIG. 10-12 are diagrams illustrating example processes associated with generating a codebook, in accordance with the present disclosure.

FIG. 10 is a diagram illustrating an example process 1000 performed, for example, by a device, in accordance with the present disclosure. Example process 1000 is an example where the device (e.g., device 400) performs operations associated with generating a codebook.

As shown in FIG. 10, in some aspects, process 1000 may include generating a plurality of electric field measurements for each frequency of a plurality of frequencies included in a frequency band associated with a wireless communication device, wherein each electric field measurement of the plurality of electric field measurements is associated with a respective frequency of the plurality of frequencies (block 1010). For example, the device (e.g., using communication manager 1608 and/or generation component 1610, depicted in FIG. 16) may generate a plurality of electric field measurements for each frequency of a plurality of frequencies included in a frequency band associated with a wireless communication device, wherein each electric field measurement of the plurality of electric field measurements is associated with a respective frequency of the plurality of frequencies, as described above. In some aspects, each electric field measurement of the plurality of electric field measurements is associated with a respective frequency of the plurality of frequencies.

As further shown in FIG. 10, in some aspects, process 1000 may include generating a codebook for the frequency band based at least in part on a first electric field measurement, of the plurality of electric field measurements, associated with a first frequency of the plurality of frequencies (block 1020). For example, the device (e.g., using communication manager 1608 and/or generation component 1610, depicted in FIG. 16) may generate a codebook for the frequency band based at least in part on a first electric field measurement, of the plurality of electric field measurements, associated with a first frequency of the plurality of frequencies, as described above.

As further shown in FIG. 10, in some aspects, process 1000 may include generating respective scaling factors for each of a plurality of second frequencies of the plurality of frequencies based at least in part on respective electric field measurements, of the plurality of electric field measurements, associated with each of the plurality of second frequencies (block 1030). For example, the device (e.g., using communication manager 1608 and/or generation component 1610, depicted in FIG. 16) may generate respective scaling factors for each of a plurality of second frequencies of the plurality of frequencies based at least in part on respective electric field measurements, of the plurality of electric field measurements, associated with each of the plurality of second frequencies, as described above.

Process 1000 may include additional aspects, such as any single aspect or any combination of aspects described below and/or in connection with one or more other processes described elsewhere herein.

In a first aspect, process 1000 includes providing the codebook and the respective scaling factors to a wireless communication device, wherein the wireless communication device includes a UE or a base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
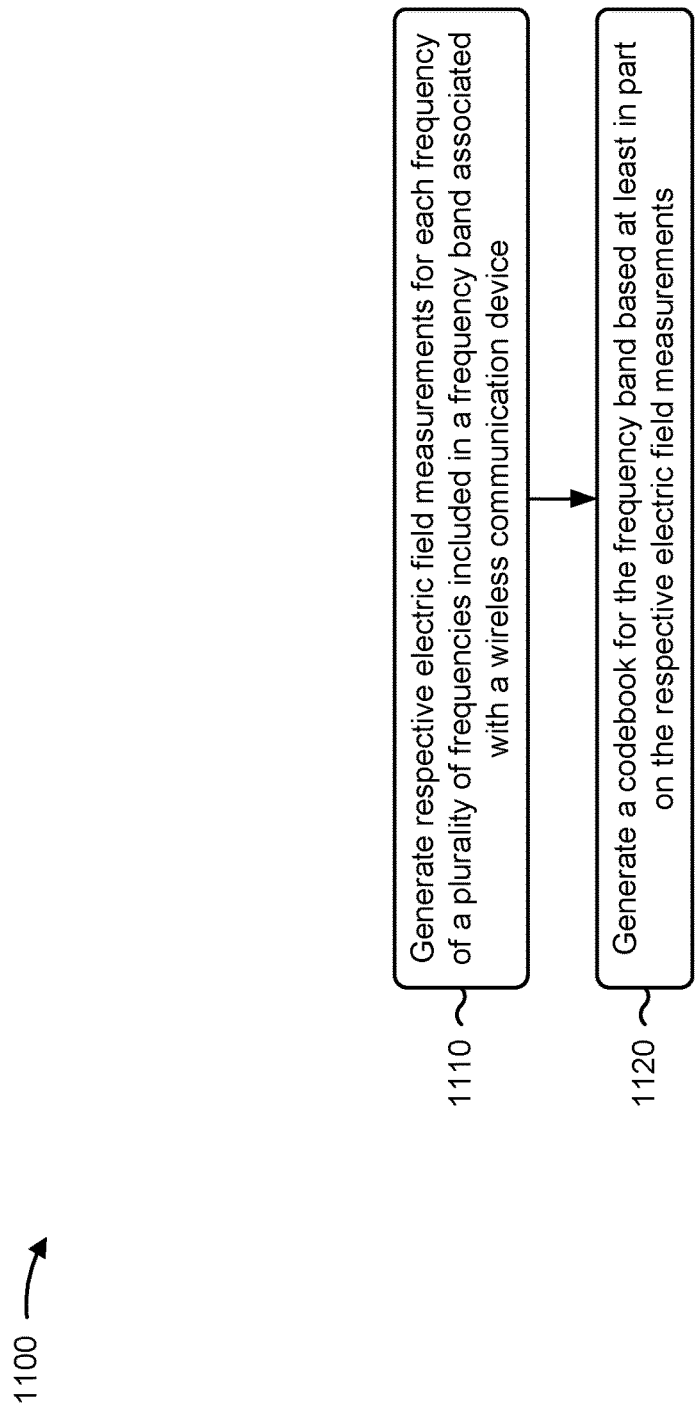

FIG. 11 is a diagram illustrating an example process 1100 performed, for example, by a device, in accordance with the present disclosure. Example process 1100 is an example where the device (e.g., device 400) performs operations associated with generating a codebook.

As shown in FIG. 11, in some aspects, process 1100 may include generating respective electric field measurements for each frequency of a plurality of frequencies included in a frequency band associated with a wireless communication device (block 1110). For example, the device (e.g., using communication manager 1608 and/or generation component 1610, depicted in FIG. 16) may generate respective electric field measurements for each frequency of a plurality of frequencies included in a frequency band associated with a wireless communication device, as described above.

As further shown in FIG. 11, in some aspects, process 1100 may include generating a codebook for the frequency band based at least in part on the respective electric field measurements (block 1120). For example, the device (e.g., using communication manager 1608 and/or generation component 1610, depicted in FIG. 16) may generate a codebook for the frequency band based at least in part on the respective electric field measurements, as described above.

Process 1100 may include additional aspects, such as any single aspect or any combination of aspects described below and/or in connection with one or more other processes described elsewhere herein.

In a first aspect, process 1100 includes providing the codebook to a wireless communication device, wherein the wireless communication device includes a UE or a base station.

In a second aspect, alone or in combination with the first aspect, generating the respective electric field measurements for each frequency of the plurality of frequencies included in the frequency band comprises generating, for each wireless communication device of a plurality of wireless communication devices, respective sets of electric field measurements for the plurality of frequencies included in the frequency band, and generating the codebook for the frequency band comprises generating respective codebooks for each wireless communication device of the plurality of wireless communication devices based at least in part on the respective sets of electric field measurements.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
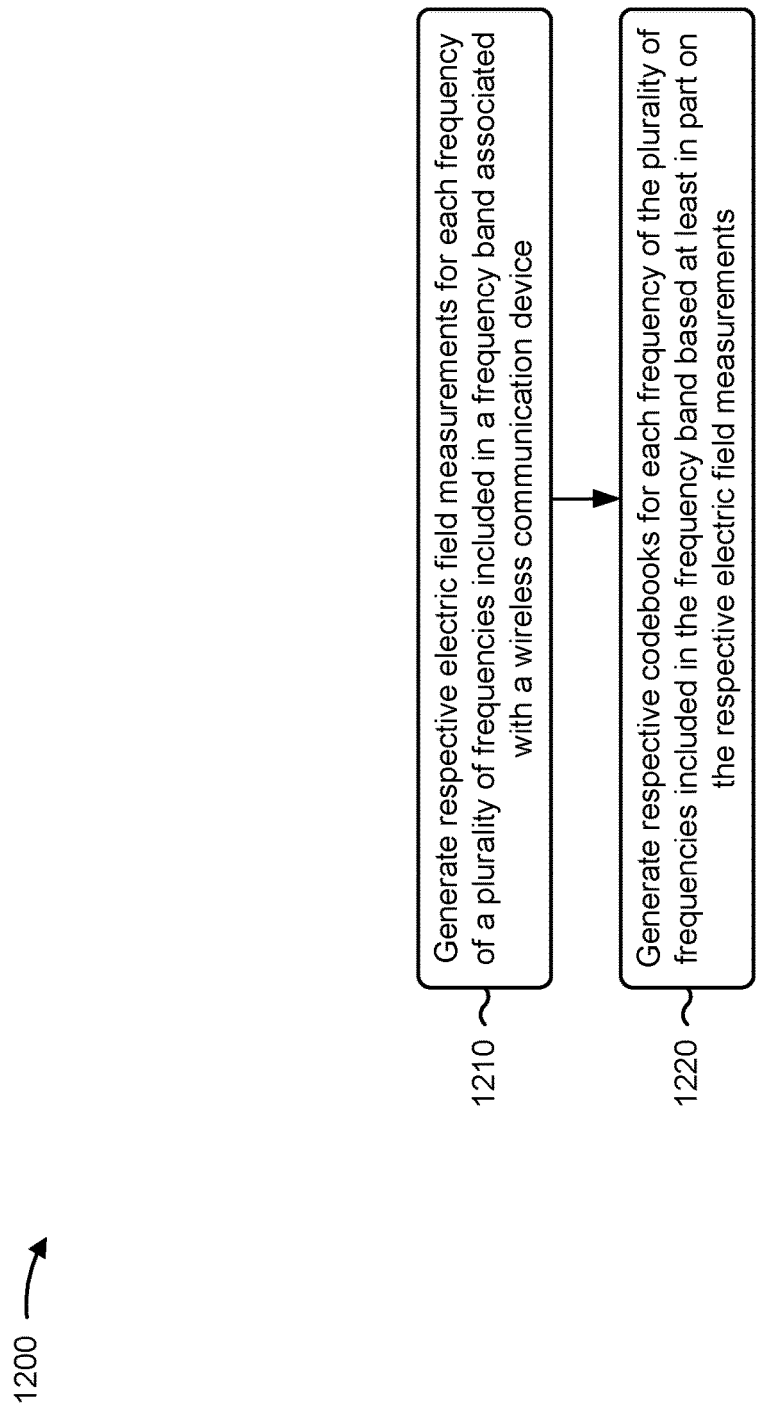

FIG. 12 is a diagram illustrating an example process 1200 performed, for example, by a device, in accordance with the present disclosure. Example process 1200 is an example where the device (e.g., device 400) performs operations associated with generating a codebook.

As shown in FIG. 12, in some aspects, process 1200 may include generating respective electric field measurements for each frequency of a plurality of frequencies included in a frequency band associated with a wireless communication device (block 1210). For example, the device (e.g., using communication manager 1608 and/or generation component 1610, depicted in FIG. 16) may generate respective electric field measurements for each frequency of a plurality of frequencies included in a frequency band associated with a wireless communication device, as described above.

As further shown in FIG. 12, in some aspects, process 1200 may include generating respective codebooks for each frequency of the plurality of frequencies included in the frequency band based at least in part on the respective electric field measurements (block 1220). For example, the device (e.g., using communication manager 1608 and/or generation component 1610, depicted in FIG. 16) may generate respective codebooks for each frequency of the plurality of frequencies included in the frequency band based at least in part on the respective electric field measurements, as described above.

Process 1200 may include additional aspects, such as any single aspect or any combination of aspects described below and/or in connection with one or more other processes described elsewhere herein.

In a first aspect, process 1200 includes providing the respective codebooks to a wireless communication device, wherein the wireless communication device includes a UE or a base station.

In a second aspect, alone or in combination with the first aspect, process 1200 includes providing a subset of the respective codebooks to a wireless communication device based at least in part on operating frequencies in the frequency band that are configured for use by the wireless communication device for wireless communication, wherein the wireless communication device includes a UE or a base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
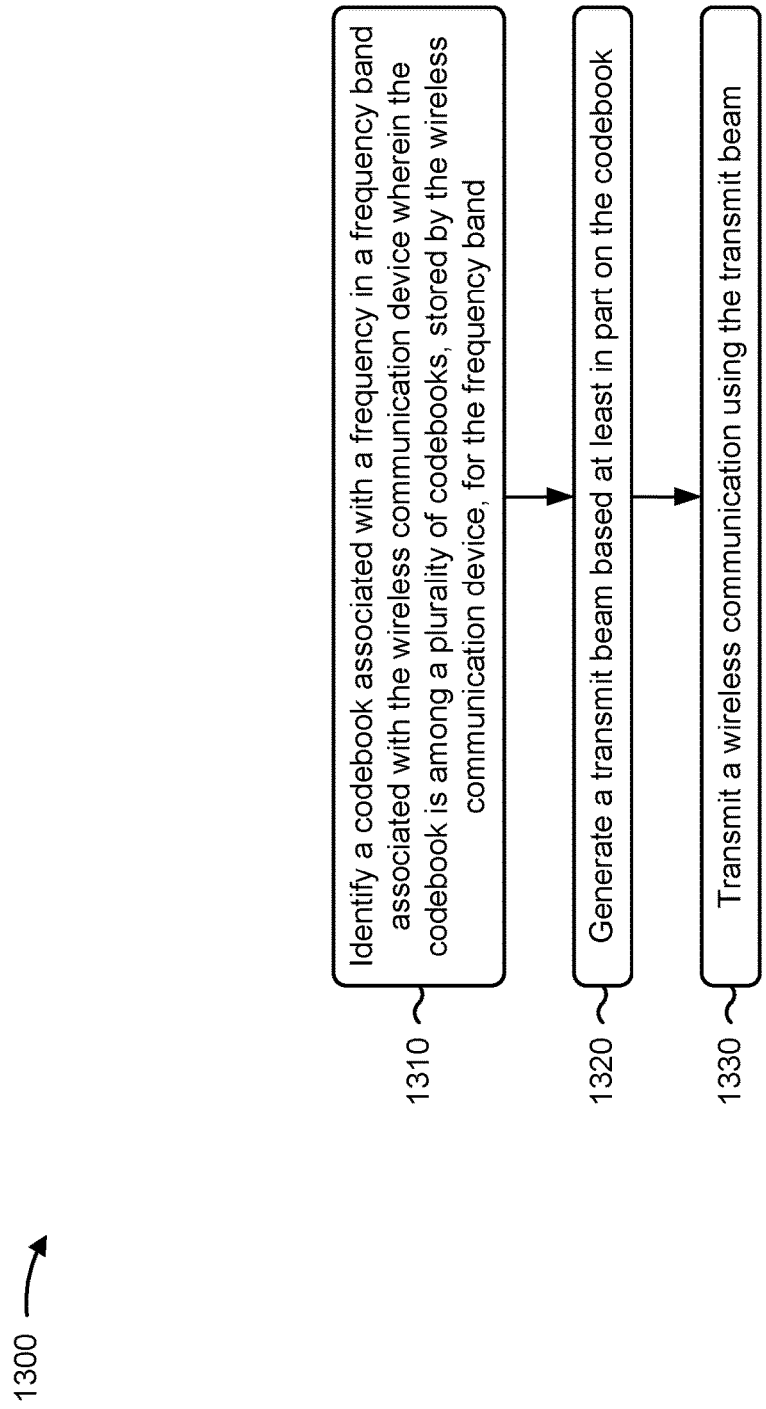
FIG. 13 is a diagram illustrating an example process associated with generating a transmit beam, in accordance with the present disclosure.

FIG. 13 is a diagram illustrating an example process 1300 performed, for example, by a wireless communication device, in accordance with the present disclosure. Example process 1300 is an example where the wireless communication device (e.g., a UE 120, a base station 110) performs operations associated with generating a transmit beam.

As shown in FIG. 13, in some aspects, process 1300 may include identifying a codebook associated with a frequency in a frequency band associated with the wireless communication device, wherein the codebook is among a plurality of codebooks, stored by the wireless communication device, for the frequency band (block 1310). For example, the wireless communication device (e.g., using communication manager 140, communication manager 150, communication manager 1408 depicted in FIG. 14, communication manager 1508 depicted in FIG. 15, identification component 1410 depicted in FIG. 14, and/or identification component 1510 depicted in FIG. 15) may identify a codebook associated with a frequency in a frequency band associated with the wireless communication device, wherein the codebook is among a plurality of codebooks, stored by the wireless communication device, for the frequency band, as described above. In some aspects, the codebook is among a plurality of codebooks, stored by the wireless communication device, for the frequency band.

As further shown in FIG. 13, in some aspects, process 1300 may include generating a transmit beam based at least in part on the codebook (block 1320). For example, the wireless communication device (e.g., using communication manager 140, communication manager 150, communication manager 1408 depicted in FIG. 14, communication manager 1508 depicted in FIG. 15, generation component 1412 depicted in FIG. 14, and/or generation component 1512 depicted in FIG. 15) may generate a transmit beam based at least in part on the codebook, as described above.

As further shown in FIG. 13, in some aspects, process 1300 may include transmitting a wireless communication using the transmit beam (block 1330). For example, the wireless communication device (e.g., using communication manager 140, communication manager 150, communication manager 1408 depicted in FIG. 14, communication manager 1508 depicted in FIG. 15, transmission component 1404 depicted in FIG. 14, and/or transmission component 1504 depicted in FIG. 15) may transmit a wireless communication using the transmit beam, as described above.

Process 1300 may include additional aspects, such as any single aspect or any combination of aspects described below and/or in connection with one or more other processes described elsewhere herein.

In a first aspect, each of the plurality of codebooks is associated with a respective frequency of a plurality of frequencies included in the frequency band.

In a second aspect, alone or in combination with the first aspect, each of the plurality of codebooks is associated with a respective frequency of a subset of frequencies, included in the frequency band, that are configured for use by the wireless communication device for wireless communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
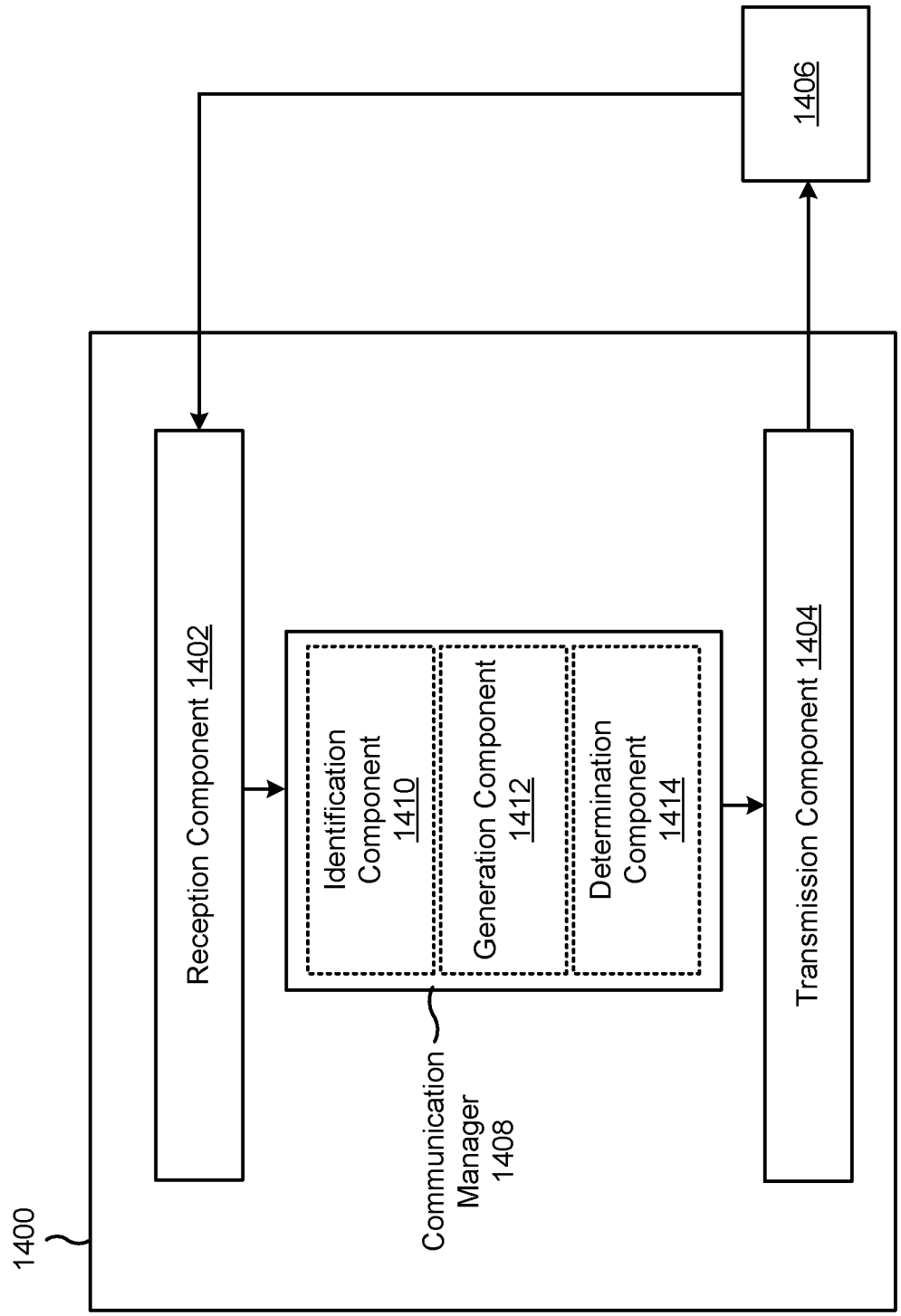
FIGS. 14-16 are diagrams of example apparatuses, in accordance with the present disclosure.

FIG. 14 is a diagram of an example apparatus 1400 for wireless communication. The apparatus 1400 may be a wireless communication device such as a UE 120, or a wireless communication device may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408, which may include or may be implemented by the communication manager 140. The communication manager 1408 may include one or more of an identification component 1410, a generation component 1412, or a determination component 1414, among other examples.

In some aspects, the apparatus 1400 may be configured to perform one or more operations described herein in connection with FIGS. 5-8. Additionally, or alternatively, the apparatus 1400 may be configured to perform one or more processes described herein, such as process 900 of FIG. 9, process 1300 of FIG. 13, or a combination thereof. In some aspects, the apparatus 1400 and/or one or more components shown in FIG. 14 may include one or more components of the UE 120 described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE 120 described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE 120 described in connection with FIG. 2. In some aspects, the transmission component 1404 may be co-located with the reception component 1402 in a transceiver.

The identification component 1410 may identify, based at least in part on a scaling factor, one or more phase weights associated with a transmit beam of the apparatus 1400, wherein the scaling factor is associated with a frequency in a frequency band associated with the apparatus 1400. The generation component 1412 may generate, based at least in part on the one or more phase weights, the transmit beam. The transmission component 1404 may transmit (e.g., to the apparatus 1406) a wireless communication using the transmit beam.

The determination component 1414 may determine the scaling factor based at least in part on at least one of an uplink configuration associated with the apparatus 1400, or a downlink configuration associated with the apparatus 1400.

The determination component 1414 may determine the scaling factor based at least in part on an uplink carrier aggregation configuration.

The determination component 1414 may determine the scaling factor based at least in part on scheduling information associated with the apparatus 1400.

The determination component 1414 may determine the scaling factor to provide greater phase weights for frequencies or carriers for which a greater quantity of wireless communications is scheduled relative to phase weights for frequencies or carriers for which a lesser quantity of wireless communications is scheduled.

The determination component 1414 may determine the scaling factor from among a plurality of scaling factors associated with the plurality of frequencies wherein each frequency of the plurality of frequencies is associated with a respective channel of a plurality of channels of the frequency band.

The identification component 1410 may identify a codebook associated with a frequency in a frequency band associated with the apparatus 1400, wherein the codebook is among a plurality of codebooks, stored by the apparatus 1400, for the frequency band. The generation component 1412 may generate a transmit beam based at least in part on the codebook. The transmission component 1404 may transmit a wireless communication (e.g., to the apparatus 1400) using the transmit beam.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
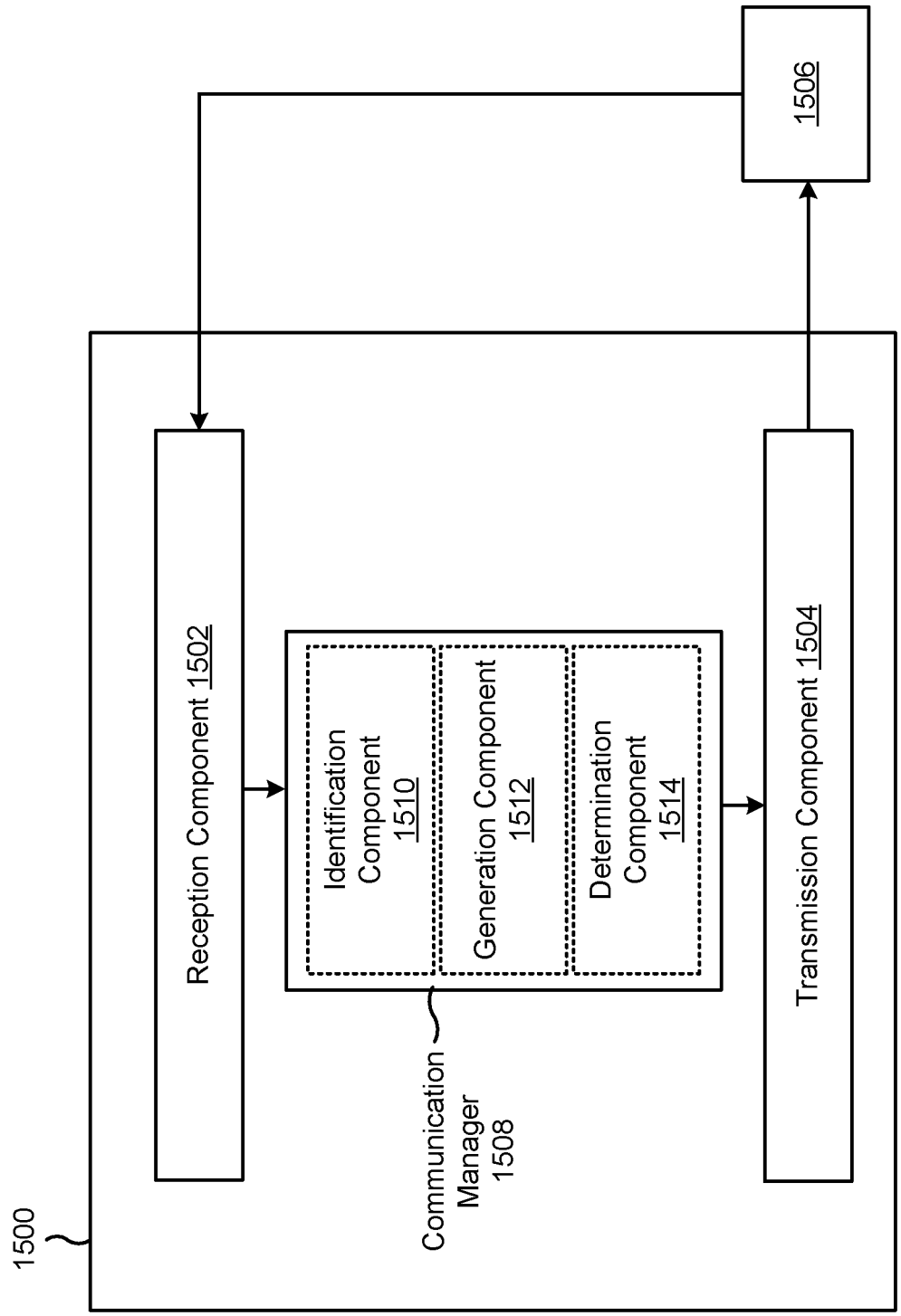

FIG. 15 is a diagram of an example apparatus 1500 for wireless communication. The apparatus 1500 may be a wireless communication device such as a base station 110, or a wireless communication device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 1508, which may include or may be implemented by the communication manager 150. The communication manager 1508 may include one or more of an identification component 1510, a generation component 1512, or a determination component 1514, among other examples.

In some aspects, the apparatus 1500 may be configured to perform one or more operations described herein in connection with FIGS. 5-8. Additionally, or alternatively, the apparatus 1500 may be configured to perform one or more processes described herein, such as process 900 of FIG. 9, process 1300 of FIG. 13, or a combination thereof. In some aspects, the apparatus 1500 and/or one or more components shown in FIG. 15 may include one or more components of the base station 110 described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the base station 110 described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the base station 110 described in connection with FIG. 2. In some aspects, the transmission component 1504 may be co-located with the reception component 1502 in a transceiver.

The identification component 1510 may identify, based at least in part on a scaling factor, one or more phase weights associated with a transmit beam of the apparatus 1500, wherein the scaling factor is associated with a frequency in a frequency band associated with the apparatus 1500. The generation component 1512 may generate, based at least in part on the one or more phase weights, the transmit beam. The transmission component 1504 may transmit (e.g., to the apparatus 1506) a wireless communication using the transmit beam.

The determination component 1514 may determine the scaling factor based at least in part on at least one of an uplink configuration associated with the apparatus 1500, or a downlink configuration associated with the apparatus 1500.

The determination component 1514 may determine the scaling factor based at least in part on an uplink carrier aggregation configuration.

The determination component 1514 may determine the scaling factor based at least in part on scheduling information associated with the apparatus 1500.

The determination component 1514 may determine the scaling factor to provide greater phase weights for frequencies or carriers for which a greater quantity of wireless communications is scheduled relative to phase weights for frequencies or carriers for which a lesser quantity of wireless communications is scheduled.

The determination component 1514 may determine the scaling factor from among a plurality of scaling factors associated with the plurality of frequencies wherein each frequency of the plurality of frequencies is associated with a respective channel of a plurality of channels of the frequency band.

The identification component 1510 may identify a codebook associated with a frequency in a frequency band associated with the apparatus 1500, wherein the codebook is among a plurality of codebooks, stored by the apparatus 1500, for the frequency band. The generation component 1512 may generate a transmit beam based at least in part on the codebook. The transmission component 1504 may transmit a wireless communication (e.g., to the apparatus 1500) using the transmit beam.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
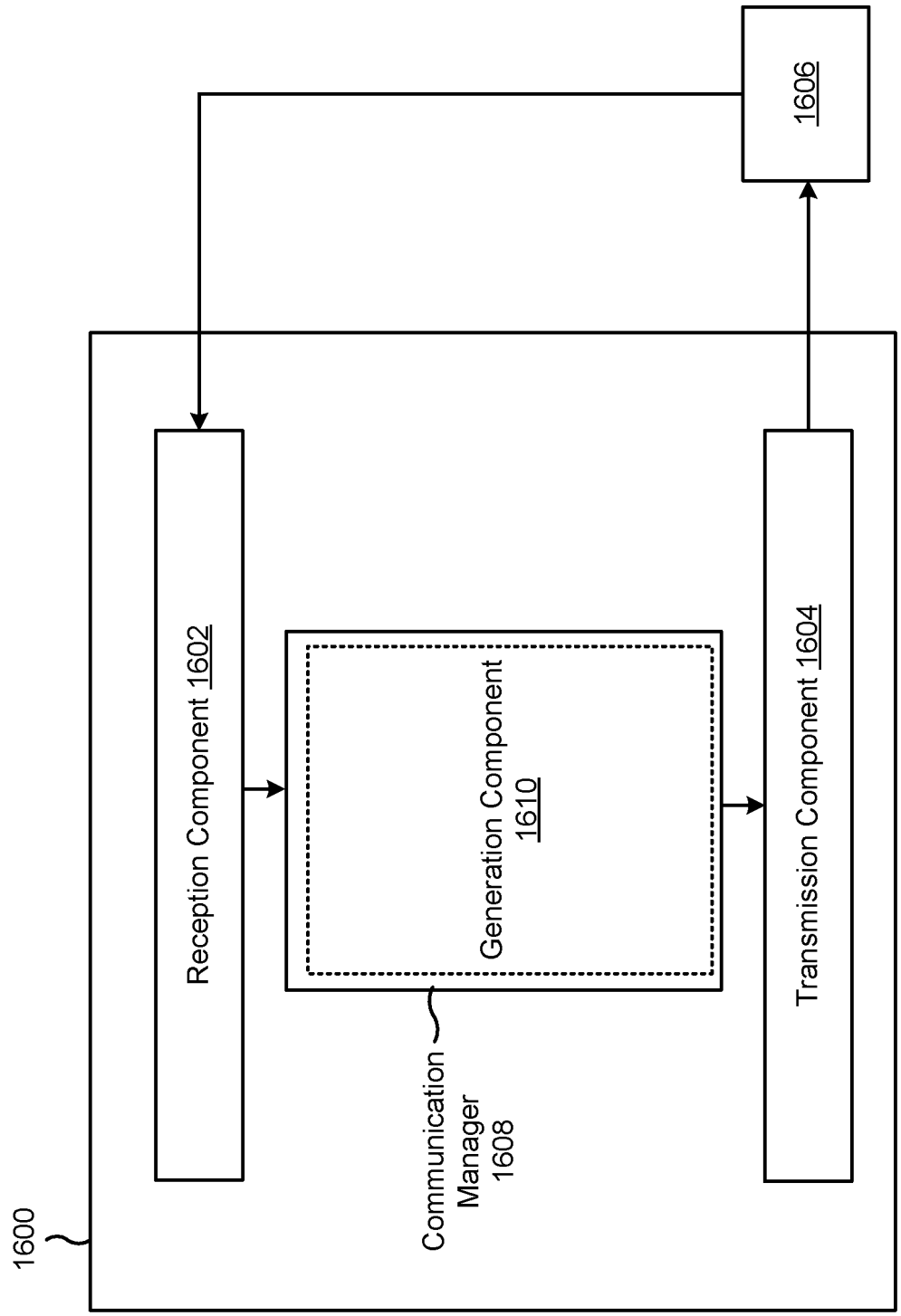

FIG. 16 is a diagram of an example apparatus 1600 for wireless communication. The apparatus 1600 may be a device 400, or a device 400 may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 1608. The communication manager 1608 may include a generation component 1610, among other examples.

In some aspects, the apparatus 1600 may be configured to perform one or more operations described herein in connection with FIGS. 5-8. Additionally, or alternatively, the apparatus 1600 may be configured to perform one or more processes described herein, such as process 1000 of FIG. 10, process 1100 of FIG. 11, process 1200 of FIG. 12, or a combination thereof. In some aspects, the apparatus 1600 and/or one or more components shown in FIG. 16 may include one or more components of the device 400 described in connection with FIG. 4. Additionally, or alternatively, one or more components shown in FIG. 16 may be implemented within one or more components described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more communication components of the device 400 described in connection with FIG. 4.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more communication components of the device 400 described in connection with FIG. 4. In some aspects, the transmission component 1604 may be co-located with the reception component 1602 in a transceiver.

The generation component 1610 may generate a plurality of electric field measurements for each frequency of a plurality of frequencies included in a frequency band associated with a wireless communication device (e.g., the apparatus 1606), wherein each electric field measurement of the plurality of electric field measurements is associated with a respective frequency of the plurality of frequencies. The generation component 1610 may generate a codebook for the frequency band based at least in part on a first electric field measurement, of the plurality of electric field measurements, associated with a first frequency of the plurality of frequencies. The generation component 1610 may generate respective scaling factors for each of a plurality of second frequencies of the plurality of frequencies based at least in part on respective electric field measurements, of the plurality of electric field measurements, associated with each of the plurality of second frequencies.

The transmission component 1604 may provide the codebook and the respective scaling factors to a wireless communication device (e.g., the apparatus 1606).

The generation component 1610 may generate respective electric field measurements for each frequency of a plurality of frequencies included in a frequency band associated with a wireless communication device (e.g., the apparatus 1606). The generation component 1610 may generate a codebook for the frequency band based at least in part on the respective electric field measurements.

The transmission component 1604 may provide the codebook to a wireless communication device (e.g., the apparatus 1606).

The generation component 1610 may generate respective electric field measurements for each frequency of a plurality of frequencies included in a frequency band associated with a wireless communication device (e.g., the apparatus 1606). The generation component 1610 may generate respective codebooks for each frequency of the plurality of frequencies included in the frequency band based at least in part on the respective electric field measurements.

The transmission component 1604 may provide the respective codebooks to a wireless communication device (e.g., the apparatus 1606).

The transmission component 1604 may provide a subset of the respective codebooks to a wireless communication device (e.g., the apparatus 1606) based at least in part on operating frequencies in the frequency band that are configured for use by the wireless communication device for wireless communication.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a wireless communication device, comprising: identifying, based at least in part on a scaling factor, one or more phase weights associated with a transmit beam of the wireless communication device, wherein the scaling factor is associated with a frequency in a frequency band associated with the wireless communication device; generating, based at least in part on the one or more phase weights, the transmit beam; and transmitting a wireless communication using the transmit beam.

Aspect 2: The method of Aspect 1, wherein the frequency comprises a first frequency; wherein the one or more phase weights are associated with a second frequency among the plurality of frequencies in the frequency band; and wherein the first frequency and the second frequency are different frequencies.

Aspect 3: The method of Aspect 2, wherein the scaling factor is based at least in part on a characterization of a first frequency response, of one or more antenna elements of the wireless communication device, on the first frequency; and wherein the one or more phase weights are based at least in part on a characterization of a second frequency response, of the one or more antenna elements, on the second frequency.

Aspect 4: The method of one or more of Aspects 1-3, wherein the scaling factor comprises a combination of a plurality of scaling factors; and wherein each scaling factor of the plurality of scaling factors is associated with a respective frequency of the plurality of frequencies.

Aspect 5: The method of one or more of Aspects 1-4, further comprising: determining the scaling factor based at least in part on at least one of: an uplink configuration associated with the wireless communication device, or a downlink configuration associated with the wireless communication device.

Aspect 6: The method of one or more of Aspects 1-5, further comprising: determining the scaling factor based at least in part on an uplink carrier aggregation configuration.

Aspect 7: The method of one or more of Aspects 1-6, further comprising: determining the scaling factor based at least in part on scheduling information associated with the wireless communication device.

Aspect 8: The method of one or more of Aspects 1-7, further comprising: determining the scaling factor to provide greater phase weights for frequencies or carriers for which a greater quantity of wireless communications is scheduled relative to phase weights for frequencies or carriers for which a lesser quantity of wireless communications is scheduled.

Aspect 9: The method of one or more of Aspects 1-8, further comprising: determining the scaling factor from among a plurality of scaling factors associated with the plurality of frequencies, wherein each frequency of the plurality of frequencies is associated with a respective channel of a plurality of channels of the frequency band.

Aspect 10: A method performed by a device, comprising: generating a plurality of electric field measurements for each frequency of a plurality of frequencies included in a frequency band associated with a wireless communication device, wherein each electric field measurement of the plurality of electric field measurements is associated with a respective frequency channel of the plurality of frequency channels; generating a codebook for the frequency band based at least in part on a first electric field measurement, of the plurality of electric field measurements, associated with a first frequency of the plurality of frequencies; and generating respective scaling factors for each of a plurality of second frequencies of the plurality of frequencies based at least in part on respective electric field measurements, of the plurality of electric field measurements, associated with each of the plurality of second frequencies.

Aspect 11: The method of Aspect 10, further comprising: providing the codebook and the respective scaling factors to a wireless communication device, wherein the wireless communication device includes a user equipment (UE) or a base station.

Aspect 12: A method performed by a device, comprising: generating respective electric field measurements for each frequency of a plurality of frequencies included in a frequency band associated with a wireless communication device; and generating a codebook for the frequency band based at least in part on the respective electric field measurements.

Aspect 13: The method of Aspect 12, further comprising: providing the codebook to a wireless communication device, wherein the wireless communication device includes a user equipment (UE) or a base station.

Aspect 14: The method of Aspect 12 or 13, wherein generating the respective electric field measurements for each frequency of the plurality of frequencies included in the frequency band comprises: generating, for each wireless communication device of a plurality of wireless communication devices, respective sets of electric field measurements for the plurality of frequencies included in the frequency band; and wherein generating the codebook for the frequency band comprises: generating respective codebooks for each wireless communication device of the plurality of wireless communication devices based at least in part on the respective sets of electric field measurements.

Aspect 15: A method performed by a device, comprising: generating respective electric field measurements for each frequency of a plurality of frequencies included in a frequency band associated with a wireless communication device; and generating respective codebooks for each frequency of the plurality of frequencies included in the frequency band based at least in part on the respective electric field measurements.

Aspect 16: The method of Aspect 15, further comprising: providing the respective codebooks to a wireless communication device, wherein the wireless communication device includes a user equipment (UE) or a base station.

Aspect 17: The method of Aspect 15 or 16, further comprising: providing a subset of the respective codebooks to a wireless communication device based at least in part on operating frequencies in the frequency band that are configured for use by the wireless communication device for wireless communication, wherein the wireless communication device includes a user equipment (UE) or a base station.

Aspect 18: A method of wireless communication performed by a wireless communication device, comprising: identifying a codebook associated with a frequency in a frequency band associated with the wireless communication device, wherein the codebook is among a plurality of codebooks, stored by the wireless communication device, for the frequency band; generating a transmit beam based at least in part on the codebook; and transmitting a wireless communication using the transmit beam.

Aspect 19: The method of Aspect 18, wherein each of the plurality of codebooks is associated with a respective frequency of a plurality of frequencies included in the frequency band.

Aspect 20: The method of Aspect 18 or 19, wherein each of the plurality of codebooks is associated with a respective frequency of a subset of frequencies, included in the frequency band, that are configured for use by the wireless communication device for wireless communication.

Aspect 21: An apparatus for wireless communication at a device, comprising a processor; memory coupled with the processor; and instructions stored in the memory and executable by the processor to cause the apparatus to perform the method of one or more of Aspects 1-9.

Aspect 22: A device for wireless communication, comprising a memory and one or more processors coupled to the memory, the one or more processors configured to perform the method of one or more of Aspects 1-9.

Aspect 23: An apparatus for wireless communication, comprising at least one means for performing the method of one or more of Aspects 1-9.

Aspect 24: A non-transitory computer-readable medium storing code for wireless communication, the code comprising instructions executable by a processor to perform the method of one or more of Aspects 1-9.

Aspect 25: A non-transitory computer-readable medium storing a set of instructions for wireless communication, the set of instructions comprising one or more instructions that, when executed by one or more processors of a device, cause the device to perform the method of one or more of Aspects 1-9.

Aspect 26: An apparatus for wireless communication at a device, comprising a processor; memory coupled with the processor; and instructions stored in the memory and executable by the processor to cause the apparatus to perform the method of one or more of Aspects 10 or 11.

Aspect 27: A device for wireless communication, comprising a memory and one or more processors coupled to the memory, the one or more processors configured to perform the method of one or more of Aspects 10 or 11.

Aspect 28: An apparatus for wireless communication, comprising at least one means for performing the method of one or more of Aspects 10 or 11.

Aspect 29: A non-transitory computer-readable medium storing code for wireless communication, the code comprising instructions executable by a processor to perform the method of one or more of Aspects 10 or 11.

Aspect 30: A non-transitory computer-readable medium storing a set of instructions for wireless communication, the set of instructions comprising one or more instructions that, when executed by one or more processors of a device, cause the device to perform the method of one or more of Aspects 10 or 11.

Aspect 31: An apparatus for wireless communication at a device, comprising a processor; memory coupled with the processor; and instructions stored in the memory and executable by the processor to cause the apparatus to perform the method of one or more of Aspects 12-14.

Aspect 32: A device for wireless communication, comprising a memory and one or more processors coupled to the memory, the one or more processors configured to perform the method of one or more of Aspects 12-14.

Aspect 33: An apparatus for wireless communication, comprising at least one means for performing the method of one or more of Aspects 12-14.

Aspect 34: A non-transitory computer-readable medium storing code for wireless communication, the code comprising instructions executable by a processor to perform the method of one or more of Aspects 12-14.

Aspect 35: A non-transitory computer-readable medium storing a set of instructions for wireless communication, the set of instructions comprising one or more instructions that, when executed by one or more processors of a device, cause the device to perform the method of one or more of Aspects 12-14.

Aspect 36: An apparatus for wireless communication at a device, comprising a processor; memory coupled with the processor; and instructions stored in the memory and executable by the processor to cause the apparatus to perform the method of one or more of Aspects 15-17.

Aspect 37: A device for wireless communication, comprising a memory and one or more processors coupled to the memory, the one or more processors configured to perform the method of one or more of Aspects 15-17.

Aspect 38: An apparatus for wireless communication, comprising at least one means for performing the method of one or more of Aspects 15-17.

Aspect 39: A non-transitory computer-readable medium storing code for wireless communication, the code comprising instructions executable by a processor to perform the method of one or more of Aspects 15-17.

Aspect 40: A non-transitory computer-readable medium storing a set of instructions for wireless communication, the set of instructions comprising one or more instructions that, when executed by one or more processors of a device, cause the device to perform the method of one or more of Aspects 15-17.

Aspect 41: An apparatus for wireless communication at a device, comprising a processor; memory coupled with the processor; and instructions stored in the memory and executable by the processor to cause the apparatus to perform the method of one or more of Aspects 18-20.

Aspect 42: A device for wireless communication, comprising a memory and one or more processors coupled to the memory, the one or more processors configured to perform the method of one or more of Aspects 18-20.

Aspect 43: An apparatus for wireless communication, comprising at least one means for performing the method of one or more of Aspects 18-20.

Aspect 44: A non-transitory computer-readable medium storing code for wireless communication, the code comprising instructions executable by a processor to perform the method of one or more of Aspects 18-20.

Aspect 45: A non-transitory computer-readable medium storing a set of instructions for wireless communication, the set of instructions comprising one or more instructions that, when executed by one or more processors of a device, cause the device to perform the method of one or more of Aspects 18-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
    identifying, based at least in part on a scaling factor, one or more phase weights associated with a transmit beam of the wireless communication device,
        wherein the scaling factor is associated with a frequency in a frequency band associated with the wireless communication device;
    generating, based at least in part on the one or more phase weights, the transmit beam; and
    transmitting a wireless communication using the transmit beam.

2. The method of claim 1, wherein the frequency comprises a first frequency;
    wherein the one or more phase weights are associated with a second frequency among a plurality of frequencies in the frequency band; and
    wherein the first frequency and the second frequency are different frequencies.

3. The method of claim 2, wherein the scaling factor is based at least in part on a characterization of a first frequency response, of one or more antenna elements of the wireless communication device, on the first frequency; and
    wherein the one or more phase weights are based at least in part on a characterization of a second frequency response, of the one or more antenna elements, on the second frequency.

4. The method of claim 1, wherein the scaling factor comprises a combination of a plurality of scaling factors; and
    wherein each scaling factor of the plurality of scaling factors is associated with a respective frequency of a plurality of frequencies in the frequency band.

5. The method of claim 1, further comprising:
determining the scaling factor based at least in part on at least one of:
    an uplink configuration associated with the wireless communication device, or
    a downlink configuration associated with the wireless communication device.

6. The method of claim 1, further comprising:
determining the scaling factor based at least in part on an uplink carrier aggregation configuration.

7. The method of claim 1, further comprising:
determining the scaling factor based at least in part on scheduling information associated with the wireless communication device.

8. The method of claim 1, further comprising:
determining the scaling factor to provide greater phase weights for frequencies or carriers for which a greater quantity of wireless communications is scheduled relative to phase weights for frequencies or carriers for which a lesser quantity of wireless communications is scheduled.

9. The method of claim 1, further comprising:
determining the scaling factor from among a plurality of scaling factors associated with a plurality of frequencies in the frequency band,
    wherein each frequency of the plurality of frequencies is associated with a respective frequency channel of a plurality of frequency channels of the frequency band.

10. A wireless communication device for wireless communication, comprising:
a memory; and
one or more processors, coupled to the memory, configured to:
    identify, based at least in part on a scaling factor, one or more phase weights associated with a transmit beam of the wireless communication device,
        wherein the scaling factor is associated with a frequency in a frequency band associated with the wireless communication device;
    generate, based at least in part on the one or more phase weights, the transmit beam; and
    transmit a wireless communication using the transmit beam.

11. The wireless communication device of claim 10, wherein the frequency comprises a first frequency;
    wherein the one or more phase weights are associated with a second frequency among a plurality of frequencies in the frequency band; and
    wherein the first frequency and the second frequency are different frequencies.

12. The wireless communication device of claim 11, wherein the scaling factor is based at least in part on a characterization of a first frequency response, of one or more antenna elements of the wireless communication device, on the first frequency; and
    wherein the one or more phase weights are based at least in part on a characterization of a second frequency response, of the one or more antenna elements, on the second frequency.

13. The wireless communication device of claim 10, wherein the scaling factor comprises a combination of a plurality of scaling factors; and
    wherein each scaling factor of the plurality of scaling factors is associated with a respective frequency of a plurality of frequencies in the frequency band.

14. The wireless communication device of claim 10, wherein the one or more processors are further configured to:
    determine the scaling factor based at least in part on at least one of:
        an uplink configuration associated with the wireless communication device, or
        a downlink configuration associated with the wireless communication device.

15. The wireless communication device of claim 10, wherein the one or more processors are further configured to:
    determine the scaling factor based at least in part on an uplink carrier aggregation configuration.

16. The wireless communication device of claim 10, wherein the one or more processors are further configured to:
    determine the scaling factor based at least in part on scheduling information associated with the wireless communication device.

17. The wireless communication device of claim 10, wherein the one or more processors are further configured to:
    determine the scaling factor to provide greater phase weights for frequencies or carriers for which a greater quantity of wireless communications is scheduled relative to phase weights for frequencies or carriers for which a lesser quantity of wireless communications is scheduled.

18. The wireless communication device of claim 10, wherein the one or more processors are further configured to:
    determine the scaling factor from among a plurality of scaling factors associated with a plurality of frequencies in the frequency band,
        wherein each frequency of the plurality of frequencies is associated with a respective frequency channel of a plurality of frequency channels of the frequency band.

19. A non-transitory computer-readable medium storing a set of instructions for wireless communication, the set of instructions comprising:
one or more instructions that, when executed by one or more processors of a wireless communication device, cause the wireless communication device to:
    identify, based at least in part on a scaling factor, one or more phase weights associated with a transmit beam of the wireless communication device,
        wherein the scaling factor is associated with a frequency in a frequency band associated with the wireless communication device;
    generate, based at least in part on the one or more phase weights, the transmit beam; and
    transmit a wireless communication using the transmit beam.

20. The non-transitory computer-readable medium of claim 19, wherein the frequency comprises a first frequency;
    wherein the one or more phase weights are associated with a second frequency among a plurality of frequencies in the frequency band; and wherein the first frequency and the second frequency are different frequencies.

21. The non-transitory computer-readable medium of claim 20, wherein the scaling factor is based at least in part on a characterization of a first frequency response, of one or more antenna elements of the wireless communication device, on the first frequency; and wherein the one or more phase weights are based at least in part on a characterization of a second frequency response, of the one or more antenna elements, on the second frequency.

22. The non-transitory computer-readable medium of claim 19, wherein the scaling factor comprises a combination of a plurality of scaling factors; and wherein each scaling factor of the plurality of scaling factors is associated with a respective frequency of a plurality of frequencies in the frequency band.

23. The non-transitory computer-readable medium of claim 19, wherein the one or more instructions further cause the wireless communication device to:

determine the scaling factor based at least in part on at least one of:
an uplink configuration associated with the wireless communication device, or
a downlink configuration associated with the wireless communication device.

24. The non-transitory computer-readable medium of claim 19, wherein the one or more instructions further cause the wireless communication device to:

determine the scaling factor based at least in part on an uplink carrier aggregation configuration.

25. An apparatus for wireless communication, comprising:

means for identifying, based at least in part on a scaling factor, one or more phase weights associated with a transmit beam of the apparatus, wherein the scaling factor is associated with a frequency in a frequency band associated with the apparatus;

means for generating, based at least in part on the one or more phase weights, the transmit beam; and means for transmitting a wireless communication using the transmit beam.

26. The apparatus of claim 25, wherein the frequency comprises a first frequency;

wherein the one or more phase weights are associated with a second frequency among a plurality of frequencies in the frequency band; and wherein the first frequency and the second frequency are different frequencies.

27. The apparatus of claim 26, wherein the scaling factor is based at least in part on a characterization of a first frequency response, of one or more antenna elements of the wireless communication device, on the first frequency; and wherein the one or more phase weights are based at least in part on a characterization of a second frequency response, of the one or more antenna elements, on the second frequency.

28. The apparatus of claim 25, wherein the scaling factor comprises a combination of a plurality of scaling factors; and wherein each scaling factor of the plurality of scaling factors is associated with a respective frequency of a plurality of frequencies in the frequency band.

29. The apparatus of claim 25, further comprising:

means for determining the scaling factor based at least in part on at least one of:
an uplink configuration associated with the apparatus, or
a downlink configuration associated with the apparatus.

30. The apparatus of claim 25, further comprising:

means for determining the scaling factor based at least in part on an uplink carrier aggregation configuration.

* * * * *